United States Patent
Matsunobu et al.

(10) Patent No.: US 9,020,273 B2
(45) Date of Patent: Apr. 28, 2015

(54) IMAGE PROCESSING METHOD, IMAGE PROCESSOR, INTEGRATED CIRCUIT, AND PROGRAM

(75) Inventors: Toru Matsunobu, Osaka (JP); Kenji Takita, Osaka (JP); Satoshi Sakaguchi, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 516 days.

(21) Appl. No.: 13/449,349

(22) Filed: Apr. 18, 2012

(65) Prior Publication Data

US 2012/0269445 A1 Oct. 25, 2012

(30) Foreign Application Priority Data

Apr. 20, 2011 (JP) ................................. 2011-094465

(51) Int. Cl.
- *G06T 3/40* (2006.01)
- *G06F 17/30* (2006.01)
- *G06K 9/46* (2006.01)

(52) U.S. Cl.
CPC .............. *G06T 3/403* (2013.01); *G06K 9/4609* (2013.01); *G06T 2207/20021* (2013.01); *G06F 17/30262* (2013.01); *G06T 2207/20192* (2013.01)

(58) Field of Classification Search
None
See application file for complete search history.

(56) References Cited

U.S. PATENT DOCUMENTS

| | | | |
|---|---|---|---|
| 6,766,067 B2 | 7/2004 | Freeman et al. | |
| 2002/0172434 A1 | 11/2002 | Freeman et al. | |
| 2006/0126960 A1* | 6/2006 | Zhou et al. | 382/261 |
| 2007/0041663 A1* | 2/2007 | Cho et al. | 382/299 |
| 2007/0047838 A1* | 3/2007 | Milanfar et al. | 382/289 |
| 2008/0069438 A1* | 3/2008 | Winn et al. | 382/160 |
| 2010/0074549 A1* | 3/2010 | Zhang et al. | 382/263 |
| 2010/0119157 A1* | 5/2010 | Kameyama | 382/195 |
| 2011/0052046 A1* | 3/2011 | Melikian | 382/159 |
| 2011/0221966 A1* | 9/2011 | Hsieh et al. | 348/665 |
| 2012/0045118 A1* | 2/2012 | Lu et al. | 382/156 |

FOREIGN PATENT DOCUMENTS

JP 2003-018398 1/2003

OTHER PUBLICATIONS

Yu-Wing Tai; Wai-Shun Tong; Chi-Keung Tang, "Perceptually-Inspired and Edge-Directed Color Image Super-Resolution," Computer Vision and Pattern Recognition, 2006 IEEE Computer Society Conference on , vol. 2, No., pp. 1948,1955, 2006.*
Glasner, D.; Bagon, S.; Irani, M., "Super-resolution from a single image," Computer Vision, 2009 IEEE 12th International Conference on , vol., No., pp. 349,356, Sep. 29, 2009-Oct. 2, 2009.*
Wolf, Lior, et al. "Patch-based texture edges and segmentation." Computer Vision—ECCV 2006. Springer Berlin Heidelberg, 2006. 481-493.*

* cited by examiner

*Primary Examiner* — Kim Vu
*Assistant Examiner* — Nathan Bloom
(74) *Attorney, Agent, or Firm* — Wenderoth, Lind & Ponack, L.L.P.

(57) ABSTRACT

An image processing method capable of appropriately increasing a resolution of an input image in which an edge direction that is a direction along an edge included in the input image is identified; a shape of an application region that is a region including at least a part of the edge is determined according to the identified edge direction; an image similar to an image within the application region having the determined shape is searched for; and an output image is generated by performing a resolution conversion process on the input image using the similar image so that the input image includes high-frequency components.

13 Claims, 17 Drawing Sheets

FIG. 9A

| -1 | 0 | 1 |
|----|---|---|
| -2 | 0 | 2 |
| -1 | 0 | 1 |

Horizontal Sobel filter

FIG. 9B

| -1 | -2 | -1 |
|----|----|----|
| 0  | 0  | 0  |
| 1  | 2  | 1  |

Vertical Sobel filter

Application region in vertical edge direction

Application region in horizontal edge direction

IMAGE PROCESSING METHOD, IMAGE PROCESSOR, INTEGRATED CIRCUIT, AND PROGRAM

CROSS REFERENCE TO RELATED APPLICATION

The present application is based on and claims priority of Japanese Patent Application No. 2011-094465 filed on Apr. 20, 2011. The entire disclosure of the above-identified application, including the specification, drawings and claims is incorporated herein by reference in its entirety.

TECHNICAL FIELD

The present invention relates to an image processing method, an image processor, an integrated circuit, and a program for generating, using an input image, an output image having a resolution higher than a resolution of the input image.

BACKGROUND OF THE INVENTION

Background Art

When a resolution of an image to be displayed on a high resolution display is lacking, it is necessary to enlarge the image so as to match the resolution of the image to a resolution of the high resolution display.

Although methods of increasing the resolution of an image have been conventionally suggested, there is a limit on processing capacity for the practical use. Thus, the combination of simple image enlargement by interpolation and image enhancement processing has supported the methods. Thus, problems of image degradation have occurred, such as blurring and noticeable jaggies in an edge.

Recent technological advances in performance of hardware have enabled allocation of larger processing capacity to the image enlargement processing. Here, attention is currently focused on the super-resolution technique capable of converting an image to an image with high quality and high resolution through complex processing.

Among the image processing methods using the super-resolution technique, a method using a training database storing data learned from examples of correspondence between high-resolution images and low-resolution images is called a training-based super-resolution (see PTL 1).

CITATION LIST

Patent Literature

[PTL 1] Japanese Unexamined Patent Application Publication No. 2003-018398

SUMMARY OF INVENTION

However, the image processing method of PTL 1 has a problem that the resolution of an input image cannot be appropriately increased.

Thus, the object of the present disclosure is, in view of the problem, to provide an image processing method of appropriately increasing the resolution of an input image.

In order to achieve the object, the image processing method according to an aspect of the present invention is an image processing method of generating, using an input image, an output image having a resolution higher than a resolution of the input image, and the method includes: identifying an edge direction that is a direction along an edge included in the input image; determining a shape of an application region according to the identified edge direction, the application region being a region including at least a part of the edge; searching for an image similar to an image within the application region having the determined shape; and generating the output image by performing a resolution conversion process on the input image using the similar image so that the input image includes high-frequency components.

The general or specific aspects may be implemented by a system, an apparatus, an integrated circuit, a computer program, or a recording medium, or by an arbitrary combination of the system, the apparatus, the integrated circuit, the computer program, and the recording medium.

With the image processing method according to the present disclosure, the resolution of an input image can be appropriately increased.

BRIEF DESCRIPTION OF DRAWINGS

These and other objects, advantages and features of the invention will become apparent from the following description thereof taken in conjunction with the accompanying drawings that illustrate a specific embodiment of the present invention. In the Drawings:

FIG. 9A illustrates a horizontal Sobel filter according to Embodiment 1;

FIG. 9B illustrates a vertical Sobel filter according to Embodiment 1;

DETAILED DESCRIPTION OF THE INVENTION

Knowledge on which the Present Invention is Based

The present inventors gave an example of an a training-based image processor, regarding the image processing method disclosed in PTL 1, and found a problem in the example.

Figure 1:
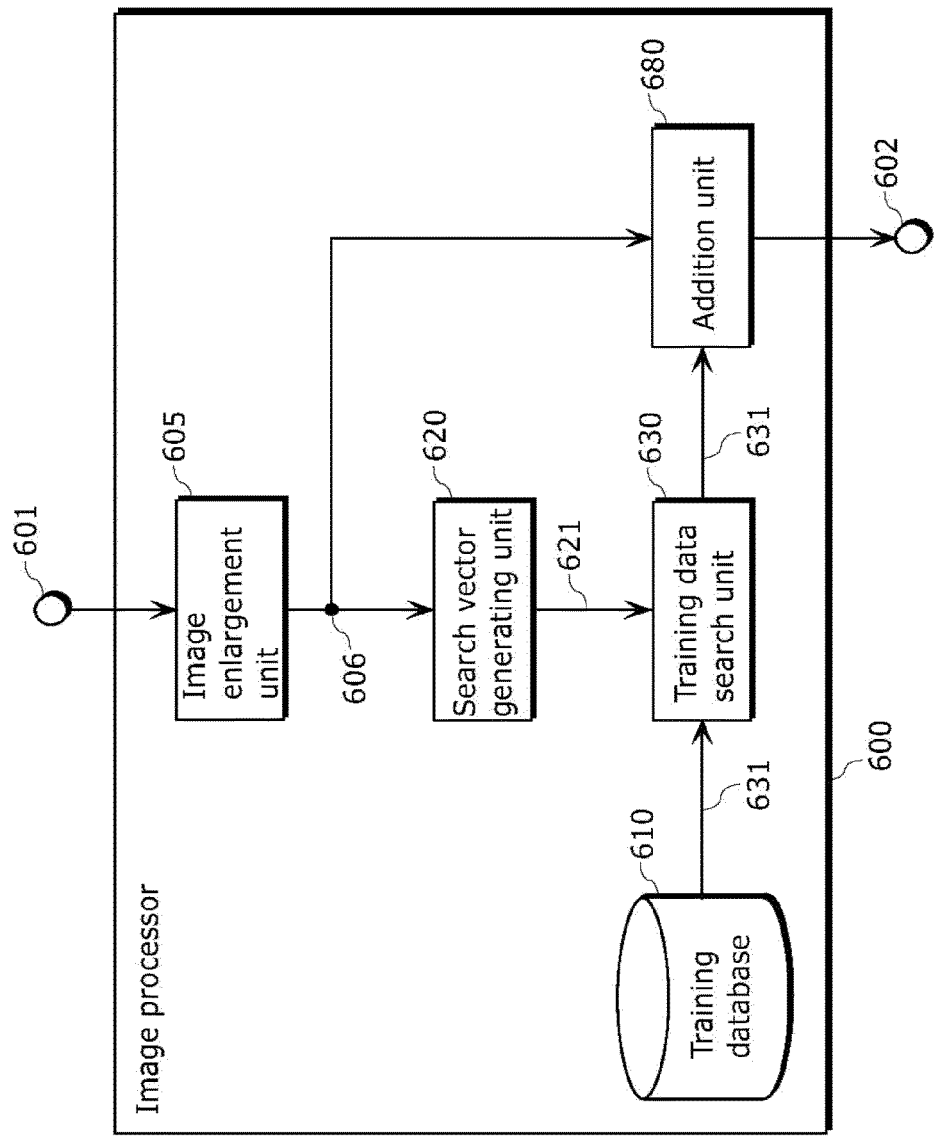
FIG. 1 is a block diagram illustrating a configuration of a training-based image processor.

FIG. 1 is a block diagram illustrating a configuration of the training-based image processor as the example.

As illustrated in FIG. 1, an image processor 600 includes a training database 610, an image enlargement unit 605, a search vector generating unit 620, a training data search unit 630, and an addition unit 680.

The image processor 600 converts an input image 601 of a low resolution into an output image 602 of a high resolution, using the training database 610 that stores index vectors and high-frequency component data items 631 that are associated one-to-one with the index vectors. Each of the index vectors is an image of low-frequency components.

The training database 610 stores the index vectors and the high-frequency component data items 631 that are associated one-to-one with the index vectors. Each of the index vectors and the high-frequency component data items 631 is a block-shaped image.

Figure 2:
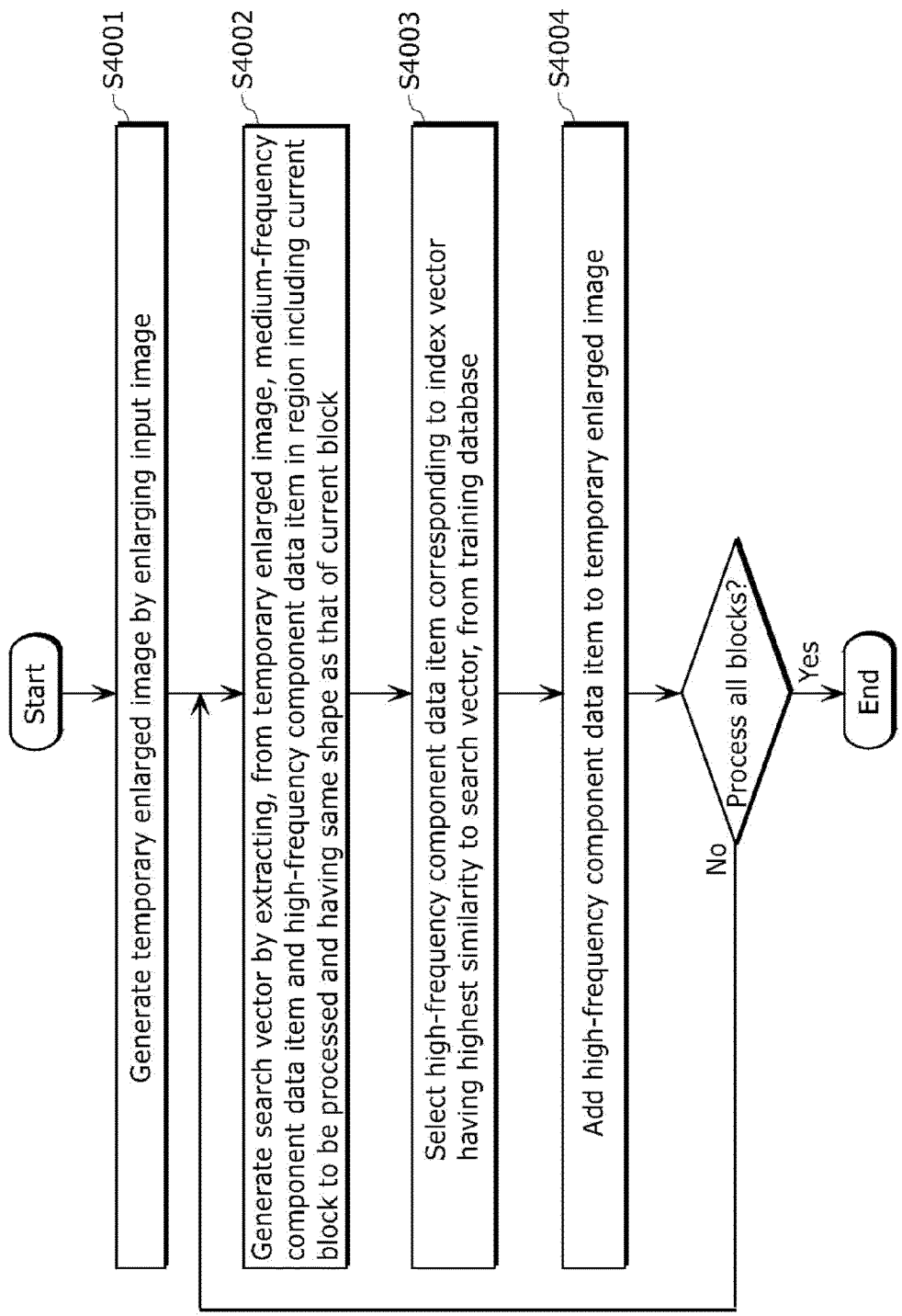
FIG. 2 is a flowchart of the image processing performed by the training-based image processor.

FIG. 2 is a flowchart of the image processing performed by the image processor 600.

At Step S4001, the image enlargement unit 605 generates a temporary enlarged image 606 by enlarging the input image 601.

The following processes are performed on each current block to be processed included in the temporary enlarged image 606 that is an enlarged image of the input image 601.

At Step S4002, the search vector generating unit 620 generates a search vector 621 by extracting, from the temporary enlarged image 606, a medium-frequency component data item and a high-frequency component data item in a region including the current block. The region has the same shape as that of the current block. In other words, the search vector 621 is a block-shaped image including the medium-frequency component data item in a current block to be processed, and the high-frequency component data item in a part of a region of a block adjacent to the current block.

At Step S4003, the training data search unit 630 selects one of the high-frequency component data items 631 that corresponds to an index vector having the highest similarity to the search vector 621, from among the index vectors stored in the training database 610.

At Step S4004, the addition unit 680 adds the selected high-frequency component data item 631 to the current block of the temporary enlarged image 606. With iterations of the processes from Steps S4002 to S4004 for each of the blocks, the output image 602 of the high resolution is generated.

With the training-based image processor and the image processing method that are given as the example, the search vector 621 is calculated from a region having the same shape as that of the current block. In other words, when the current block is a square, the search vector 621 is calculated from a square region. Since a ratio of a length of a diagonal line of the square to a length of a side of the square is a square root of 2 to 1, the side horizontal or vertical to the square region is shorter than the diagonal line, and the edge features in the horizontal or vertical direction that are included in the region tend to be smaller than the edge features in the diagonal direction along the diagonal line. In other words, even when the edge features in the region along the diagonal line can sufficiently be obtained, the edge features in the horizontal or vertical direction cannot sufficiently be obtained.

Thus, with the training-based image processor and the image processing method that are given as the example, it is not possible to search for an appropriate index vector having similarities with the features in the region including the edge in the horizontal or vertical direction, and to sufficiently increase the resolution of the image of the block included in the region. As a result, the super-resolution effect (precision of increasing a resolution) for each block becomes non-uniform depending on a direction of an edge included in the region corresponding to the block.

The present invention has been conceived to solve the problems, and has an object of providing an image processing method, an image processor, and others for appropriately increasing the resolution of an input image by obtaining the super-resolution effect equivalent in any edge direction.

In order to achieve the object, the image processing method according to an aspect of the present invention is an image processing method of generating, using an input image, an output image having a resolution higher than a resolution of the input image, and the method includes: identifying an edge direction that is a direction along an edge included in the input image; determining a shape of an application region according to the identified edge direction, the application region being a region including at least a part of the edge; searching for an image similar to an image within the application region having the determined shape; and generating the output image by performing a resolution conversion process on the input image using the similar image so that the input image includes high-frequency components.

Since the shape of the application region is not fixed and is determined according to an edge direction, an image in the application region in any direction of an edge can be used. The application region sufficiently includes features of the edge. Furthermore, since a similar image is searched for and the resolution conversion process is performed, using the image in the application region having the determined shape, the super-resolution effect can be obtained equivalently for an edge in any direction. As a result, it is possible to suppress non-uniformity in the super-resolution effect for each block, and appropriately increase the resolution of the input image.

For example, in the determining, a shape having a second width and a first width longer than the second width may be determined as the shape of the application region, the second width being a width of the application region in the identified edge direction, and the first width being a width of the application region in a direction vertical to the edge direction.

As such, since the input image includes more features in the direction vertical to the edge direction than features in the edge direction, the super-resolution effect with higher precision can be obtained for an edge in any direction by determining the shape having the second width in the edge direction and the first width that is longer than the second width and is in the direction vertical to the edge direction, as the shape of the application region.

Furthermore, for example, in the identifying, an edge direction of an edge may be identified for each of blocks included in the input image, the edge being included in the block, in the determining, a shape of an application region may be determined for each of the blocks, according to the edge direction identified for the block, in the searching, an image similar to an image within the application region having the shape determined for the block may be searched for each of the blocks, and in the generating, the output image may be generated by performing the resolution conversion process on each of the blocks using the similar image that is searched for the block.

Accordingly, the equivalent super-resolution effect can be obtained for each of the blocks.

Furthermore, for example, in the determining, a shape having the first width and the second width may be determined for each of the blocks as the shape of the application region for the block, the first width being longer than a width of the block in a direction vertical to the edge direction, the second width being shorter than a width of the block in the edge direction, and the edge direction being identified for the block. More specifically, in the determining, the shape of the application region may be determined so that the number of pixels included in the application region corresponding to each of the blocks is equal to or smaller than the number of pixels included in the block.

Accordingly, since the application region has a size identical to or smaller than the block corresponding to the application region, the searching load can be more reduced than the case of searching for a similar image that is similar to the image in the block.

Furthermore, for example, in the searching, (i) a database may be used, the database holding a plurality of search images, and a plurality of application images associated one-to-one with the search images and including more high-frequency components than high-frequency components of the search images, and (ii) the search images held in the database may be searched for, as the similar image, a search image including an image similar to an image within an application region having a shape determined for a current block to be processed, and in the generating, the resolution conversion process may be performed on the current block by selecting, from the database using the similar image obtained in the searching, an application image associated with the similar image and adding the selected application image to the current block.

Accordingly, the resolution conversion process is performed on the current block by adding, to the current block, the application image (the training high-frequency image) held in the database associated with the search image that is similar to the image within the application region. Thus, the resolution of the current block can be simply increased by appropriately managing the associations in the database.

Furthermore, for example, in the searching, the database may be searched for a plurality of search images as a plurality of similar images, the search images each including an image similar to the image within the application region having the shape determined for the current block, and in the generating, the resolution conversion process may be performed on the current block by (i) selecting, from the database using the similar images obtained in the searching, a plurality of application images associated one-to-one with the similar images, (ii) generating a synthesized image by synthesizing the selected application images, and (iii) adding the synthesized image to the current block.

After synthesizing a plurality of application images, the synthesized image is added to the current block. Thus, noise included in the output image can be reduced.

Furthermore, for example, a plurality of application images larger in size than the blocks may be held in the database in one-to-one association with the search images, and in the generating, the synthesized image may be added to the current block and a part of at least one of the blocks around the current block so that the center of the synthesized image matches the center of the current block, the synthesized image being larger than the current block.

Since the application images and the synthesized image are larger than the current block, addition is performed so that the center of the synthesized image matches the center of the current block. Thus, artifacts between the blocks can be reduced.

Furthermore, for example, the image processing method may further include enlarging the input image, wherein the identifying, the determining, the searching, and the generating may be performed on each of blocks included in the enlarged input image.

Accordingly, the resolution of the input image can be appropriately increased.

Furthermore, for example, the image processing method may further include extracting, as medium-frequency components from each of the blocks included in the enlarged input image, frequency components excluding low-frequency components, wherein in the searching, a search image may be searched for each of the blocks, the search image including an image similar to an image of the medium-frequency components within an application region having a shape determined for the block.

Since the images of medium-frequency components included in the blocks of the input image are used for search, the search images in the database can be images only of medium-frequency components, and the application images associated with the search images can be images of high-frequency components. Furthermore, since the search images do not include low-frequency components, the correlation between the search images and the application images can be increased. As a result, the resolution of the input image can be appropriately increased.

Furthermore, for example, in the searching, a similar image corresponding to a current block to be processed may be searched for by matching a position of the image within the application region having the determined shape to a position of a picture included in a moving image, the picture being other than the input image, and the moving image including the input image that is a picture, and in the generating, a reference block including at least a part of the similar image obtained in the searching may be obtained from the picture other than the input image using the similar image, and the resolution conversion process may be performed on the current block by interpolating pixels in the current block using pixels in the reference block.

The similar images for the current block are searched for by matching the position of the picture other than the input image to the position of the image within the application region with the sub-pixel precision, that is, by performing the motion estimation and the motion compensation with the sub-pixel precision. Accordingly, the resolution of the moving image can be appropriately increased.

The image processing method and the image processor according to one or more aspects of the present invention will be specifically described with reference to drawings.

Each Embodiment below describes a specific example of the present invention. The values, shapes, materials, constituent elements, dispositions and connections of the constituent elements, steps, and the order of the steps are examples, and do not limit the present invention. Furthermore, among the constituent elements in each Embodiment, the constituent elements that are not described in independent claims indicating the most generic concept are described as arbitrary constituent elements.

Embodiment 1

Figure 3:
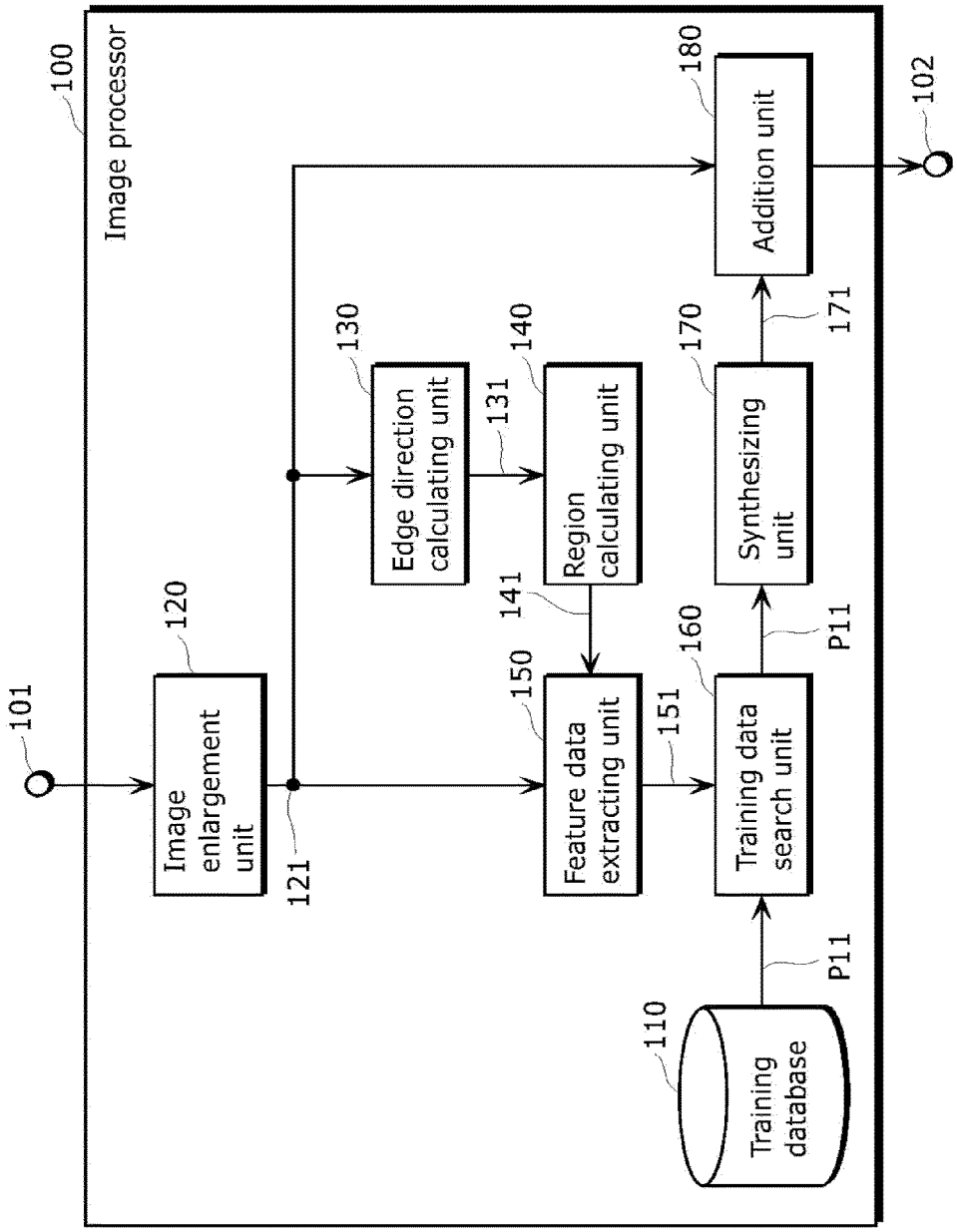
FIG. 3 is a block diagram illustrating a configuration of an image processor according to Embodiment 1 of the present invention.

FIG. 3 is a block diagram illustrating a configuration of an image processor 100 according to Embodiment 1 in the present invention. The image processor 100 is an apparatus that appropriately increase the resolution of an input image, and generates, using an input image 101 received from outside of the image processor 100, an output image 102 having a resolution higher than that of the input image 101. The input image 101 may be any one of a moving image and a still image.

As illustrated in FIG. 3, the image processor 100 includes a training database 110, an image enlargement unit 120, an edge direction calculating unit 130, a region calculating unit 140, a feature data extracting unit 150, a training data search unit 160, a synthesizing unit 170, and an addition unit 180.

First, the training database 110 will be described.

Figure 4:
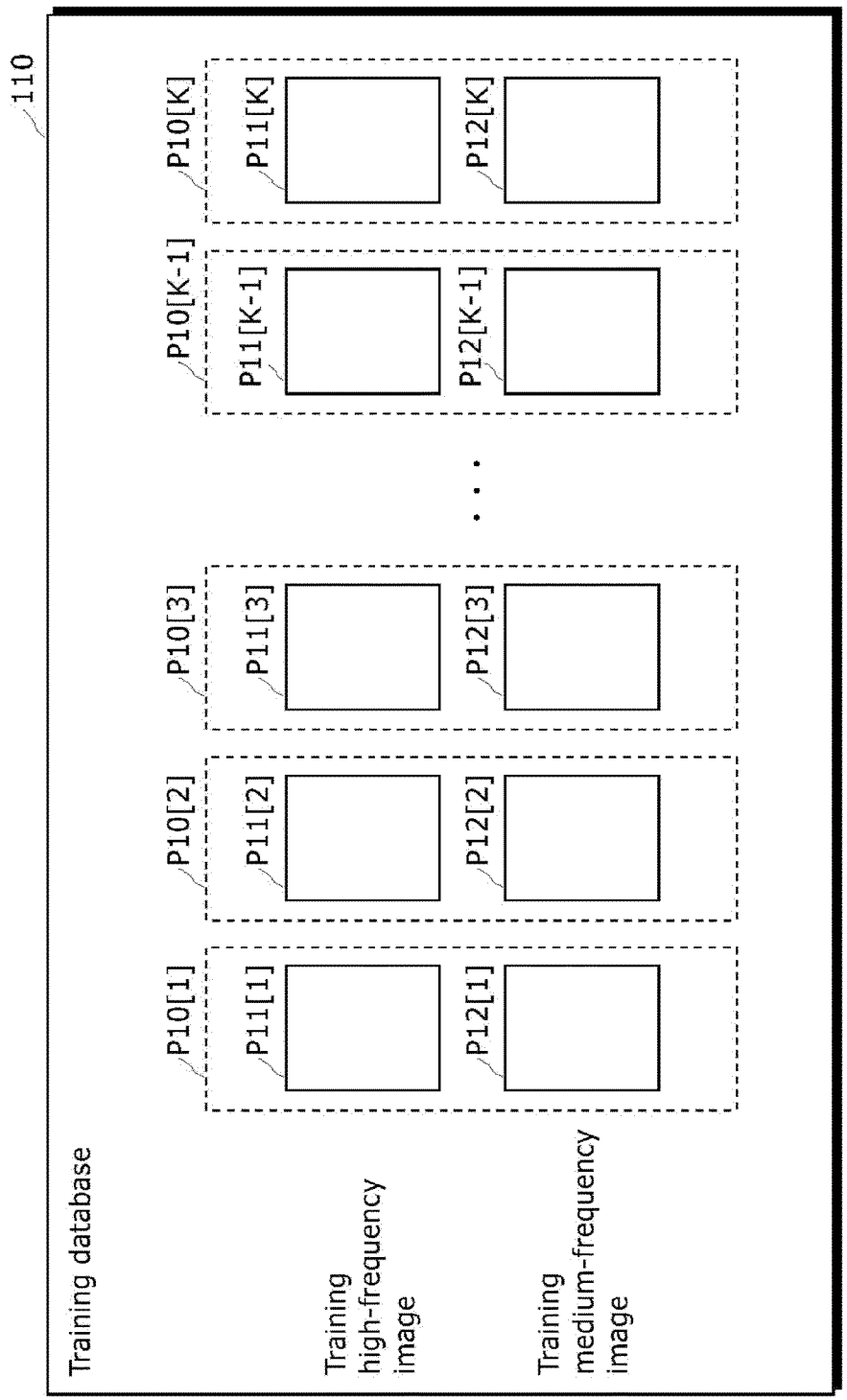
FIG. 4 illustrates data stored in a training database according to Embodiment 1.

FIG. 4 illustrates data stored in the training database 110.

As illustrated in FIG. 4, the training database 110 stores training high-frequency images P11[1], P11[2], ..., P11[K], and training medium-frequency images P12[1], P12[2], ..., P12[K]. Here, K is an integer equal to or larger than 2.

Hereinafter, each of the training high-frequency images P11[1], P11[2], ..., P11[K] is simply referred to as a training high-frequency image P11. Furthermore, each of the training medium-frequency images P12[1], P12[2], ..., P12[K] is simply referred to as a training medium-frequency image P12. The training medium-frequency image P12 is a search image, and the training high-frequency image is an application image.

The training database 110 stores training image pairs of the training high-frequency images P11 and the training medium-frequency images P12 that are associated with each other. More specifically, the training database 110 stores the training image pairs P10[1], P10[2], ..., P10[K]. In other words, the training database 110 holds (i) a plurality of search images (the training medium-frequency images P12), and (ii) a plurality of application images (the training high-frequency images P11) that are associated one-to-one with the search images and include more high-frequency components than those of the search images.

Hereinafter, each of the training image pairs P10[1], P10[2], ..., P10[K] is also simply referred to as a training image pair P10. The K training image pairs P10 are different from each other. Each of the training image pairs P10 is a training image pair in which the training high-frequency image P11 and the training medium-frequency image P12 that are generated from the same block in the same image are associated with each other.

Next, a method of generating the training high-frequency image P11 and the training medium-frequency image P12 will be described. The training high-frequency image P11 and the training medium-frequency image P12 are generated by a training image generating apparatus 50 to be described hereinafter.

Figure 5:
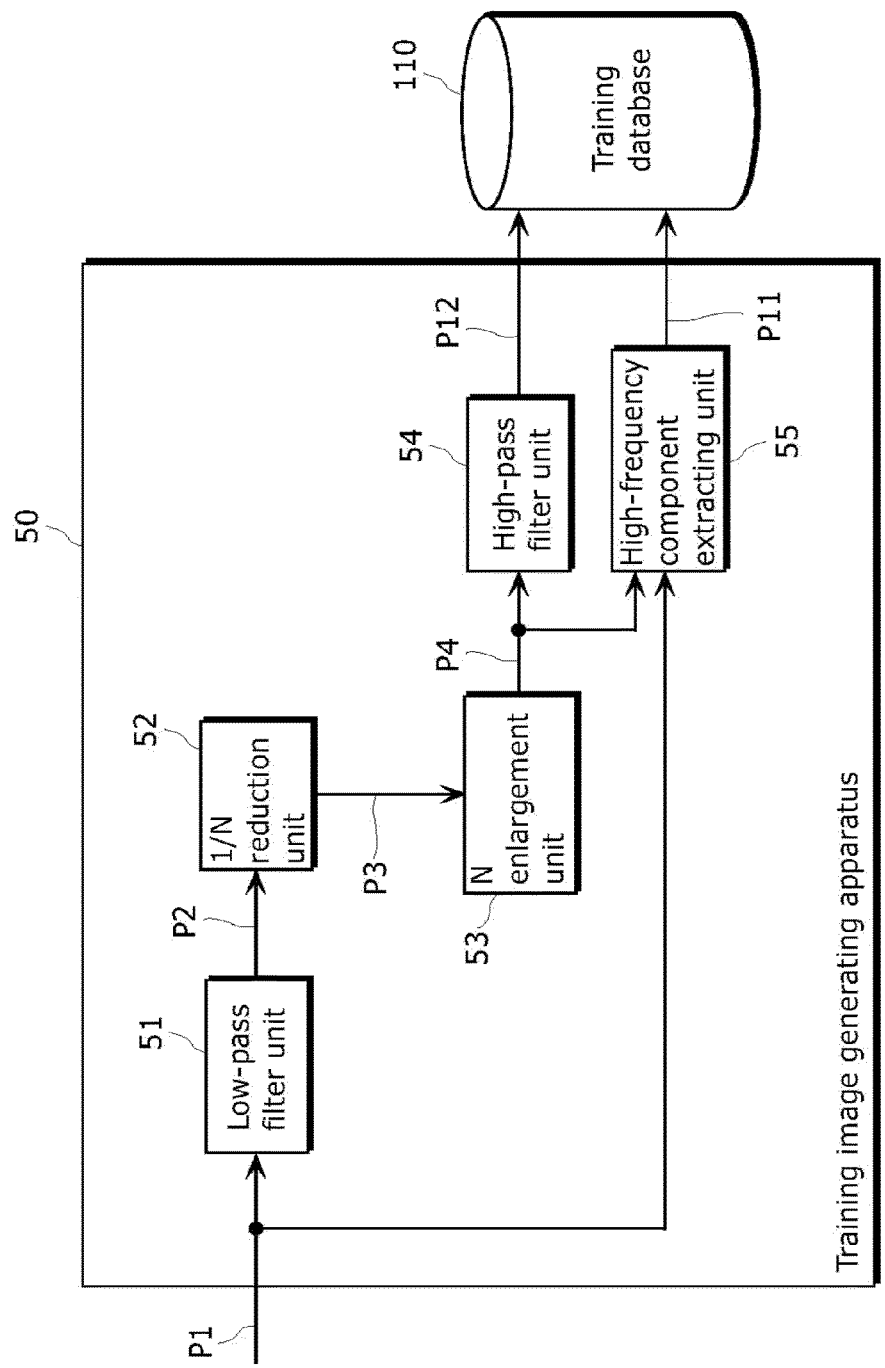
FIG. 5 is a block diagram illustrating a configuration of a training image generating apparatus according to Embodiment 1.

FIG. 5 is a block diagram illustrating a configuration of the training image generating apparatus 50. FIG. 5 also illustrates the training database 110 included in the image processor 100 for describing the training image generating apparatus 50. The training image generating apparatus 50 generates the training high-frequency images P11 and the training medium-frequency images P12, using each of training images P1 captured in advance by, for example, a digital camera. The training image generating apparatus 50 processes several hundred training images P1, for example.

As illustrated in FIG. 5, the training image generating apparatus 50 includes a low-pass filter unit 51, a 1/N reduction unit 52, an N enlargement unit 53, a high-pass filter unit 54, and a high-frequency component extracting unit 55.

The high-frequency component extracting unit 55 extracts a difference between the training image P1 and a training low-frequency image P4 that is transmitted from the N enlargement unit 53 and is to be described later, as high-frequency components of the training image P1, and partitions an image including the high-frequency components into blocks of a predetermined size. Then, the high-frequency component extracting unit 55 stores each of the resulting blocks in the training database 110 as the training high-frequency image P11.

The high-frequency component extracting unit 55 may extract high-frequency components of the training image P1 by linear filtering and others.

Furthermore, the low-pass filter unit 51 extracts low-frequency components of the training image P1 as a training low-frequency image P2 by linear filtering and others.

The 1/N reduction unit 52 reduces the training low-frequency image P2 to 1/N in each of the horizontal and vertical directions to generate a training low-frequency image P3.

The N enlargement unit 53 enlarges the training low-resolution image P3 by a factor N in each of the horizontal and vertical directions to generate the training low-frequency image P4. The N enlargement unit 53 transmits the training low-frequency image P4 to the high-pass filter unit 54 and the high-frequency component extracting unit 55.

The high-pass filter unit 54 extracts high-frequency components from the training low-frequency image P4 by linear filtering and others, and partitions an image of the high-frequency components into blocks of a fixed size. Then, the high-pass filter unit 54 stores each of the resulting blocks in the training database 110 as the training medium-frequency image P12.

The training image generating apparatus 50 may generate the training medium-frequency image P12 only through processes performed by the low-pass filter unit 51 and the high-pass filter unit 54, without using the 1/N reduction unit 52 and the N enlargement unit 53.

The size of the training high-frequency image P11 is the same as that of the training medium-frequency image P12. Each of the training high-frequency image P11 and the training medium-frequency image P12 has, for example, a size of horizontal 18×vertical 18 pixels.

Here, the high-pass filter unit 54 and the high-frequency component extracting unit 55 store, in the training database 110, the training image pair P10 in which the training high-frequency image P11 and the training medium-frequency image P12 correspond to a block at the same coordinates (position) in the same training image P1 and are associated with each other, as illustrated in FIG. 4.

The process of storing the training image pair P10 in the training database 110 is performed on all of the target training images P1 to be processed, so that K training image pairs P10 are stored in the training database 110. K is, for example, 100,000. In other words, for example, the 100,000 training image pairs P10 are stored in the training database 110.

Here, the training high-frequency image P11 and the training medium-frequency image P12 corresponding to each of the training image pairs P10 are images corresponding to a block at the same coordinates (position) in the same training image P1.

With the processes, a lot of kinds of the training image pairs P10 are stored in the training database 110.

The training high-frequency image P11 is a synthesized image 171 to be described later, and is a training data item for generating an output image of a high resolution. In other words, the training database 110 stores K pairs of training data items. In each of the pairs, the first training data item (training high-frequency image P11) obtained from the high-frequency components of the training image P1 is associated with the second training data item (training medium-frequency image P12) obtained at least from the low-frequency components of the training image P1.

The image enlargement unit 120 generates a temporary enlarged image 121 by enlarging the input image 101. The input image 101 is an image having a resolution to be converted. The input image 101 has, for example, a size of horizontal 1920 pixels×vertical 1080 pixels. The size of the input image 101 is not limited to the size of horizontal 1920 pixels× vertical 1080 pixels, and the input image 101 may have, for example, a size of horizontal 1440 pixels×vertical 1080 pixels.

The edge direction calculating unit 130 extracts horizontal feature data and vertical feature data from the enlarged input image 101 (temporary enlarged image 121), and calculates an edge direction 131 based on the horizontal feature data and the vertical feature data. The details will be described later. The edge direction 131 is a direction along an edge, and indicates an angle of the edge. More specifically, the edge direction 131 represents a vertical angle with respect to an array direction of pixels that (i) are included in a block to be processed (hereinafter referred to as a current block to be processed) within the temporary enlarged image 121 and (ii) have larger change in the luminance. In other words, the edge direction calculating unit 130 identifies, for each of the blocks included in the temporary enlarged image 121 that is the enlarged input image 101, an edge direction that is a direction along an edge included in the block.

The region calculating unit 140 calculates, within the temporary enlarged image 121 based on the edge direction 131, an application region to be used for extracting region feature data 151 for calculating a similarity with the training medium-frequency image P12. The details will be described later. In other words, the region calculating unit 140 determines, for each of the blocks, the shape of the application region that is a region including at least a part of the edge in the block, according to the edge direction identified for the block.

The feature data extracting unit 150 extracts the region feature data 151 from the application region. The region feature data 151 is an image of medium-frequency components. In other words, the feature data extracting unit 150 extracts, for each of the blocks included in the temporary enlarged image 121 that is the enlarged input image 101, frequency components excluding the low-frequency components as the region feature data 151.

The training data search unit 160 calculates a similarity between the region feature data 151 and each of the K training medium-frequency images P12 stored in the training database 110. The details will be described later. Then, the training data search unit 160 selects the training high-frequency images P11 corresponding one-to-one to the training medium-frequency images P12, based on the calculated similarities. In other words, the training data search unit 160 searches, using the training database 110, K search images held in the training database 110 (training medium-frequency images P12) for a plurality of search images each including an image within an application region having the shape determined for the current block, as respective similar images. Then, the training database 110 selects application images (training high-frequency images P11) associated one-to-one with the similar images (training medium-frequency images P12) in the training database 110, using the similar images.

The synthesizing unit 170 generates the synthesized image 171 using the selected training high-frequency images P11. The details will be described later. In other words, the synthesizing unit 170 generates the synthesized image 171 using the selected application images (training high-frequency images P11).

The addition unit 180 adds the synthesized image 171 to the temporary enlarged image 121 per block to generate the output image 102. The details will be described later. In other words, the adding unit 180 adds the synthesized image 171 to the current block so as to perform a resolution conversion process on the current block. The adding unit 180 performs such addition per block to generate the output image 102.

According to the image processor in FIG. 1 and the image processing method in FIG. 2, one of the high-frequency component data items is selected using the feature data (search vector) extracted from a region having the same shape as that of the current block. On the other hand, in Embodiment 1, the training high-frequency images P11 are selected using the region feature data 151 extracted from a region from which the edge features are easily obtained, according to the edge direction.

Next, the image processing method performed by the image processor 100 will be specifically described with reference to FIGS. 6 to 10.

Figure 6:
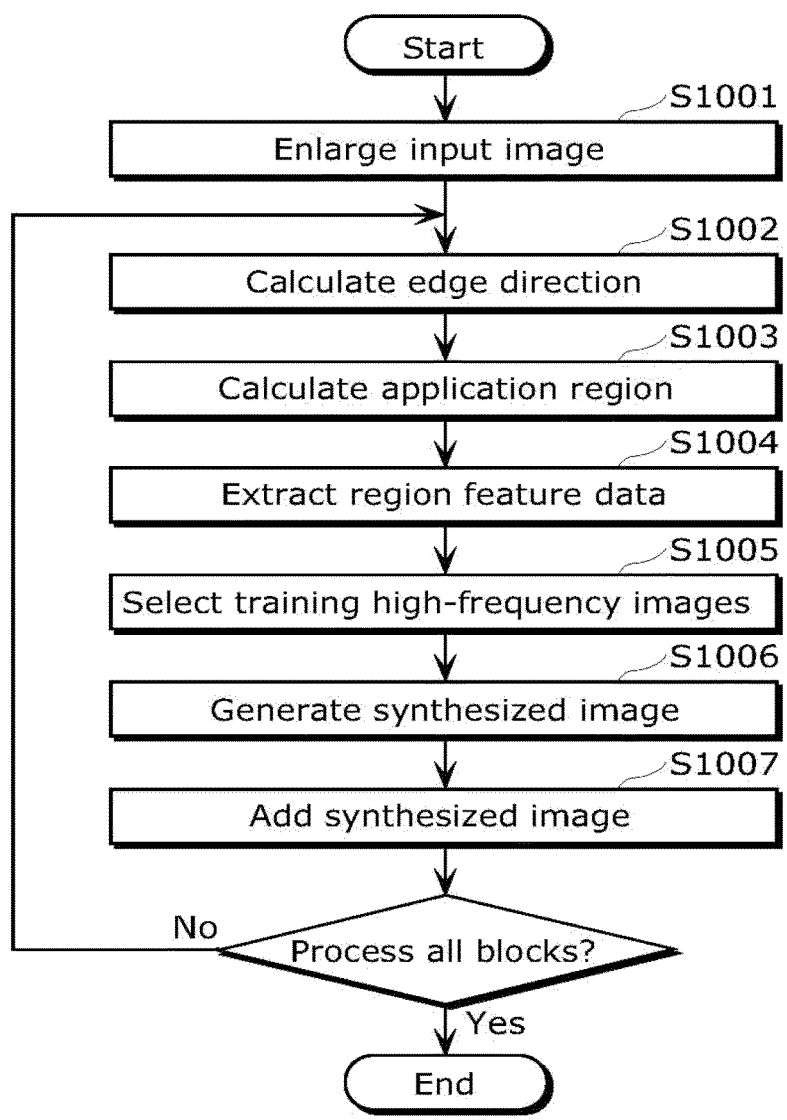
FIG. 6 is a flowchart of the image processing performed by the image processor according to Embodiment 1.

FIG. 6 is a flowchart of the image processing performed by the image processor 100 according to Embodiment 1. Embodiment 1 is described assuming that the input image 101 is a still image.

The image processor 100 converts the input image 101 into the output image 102 that is a high-resolution image, using an image stored in the training database 110.

Figure 7:
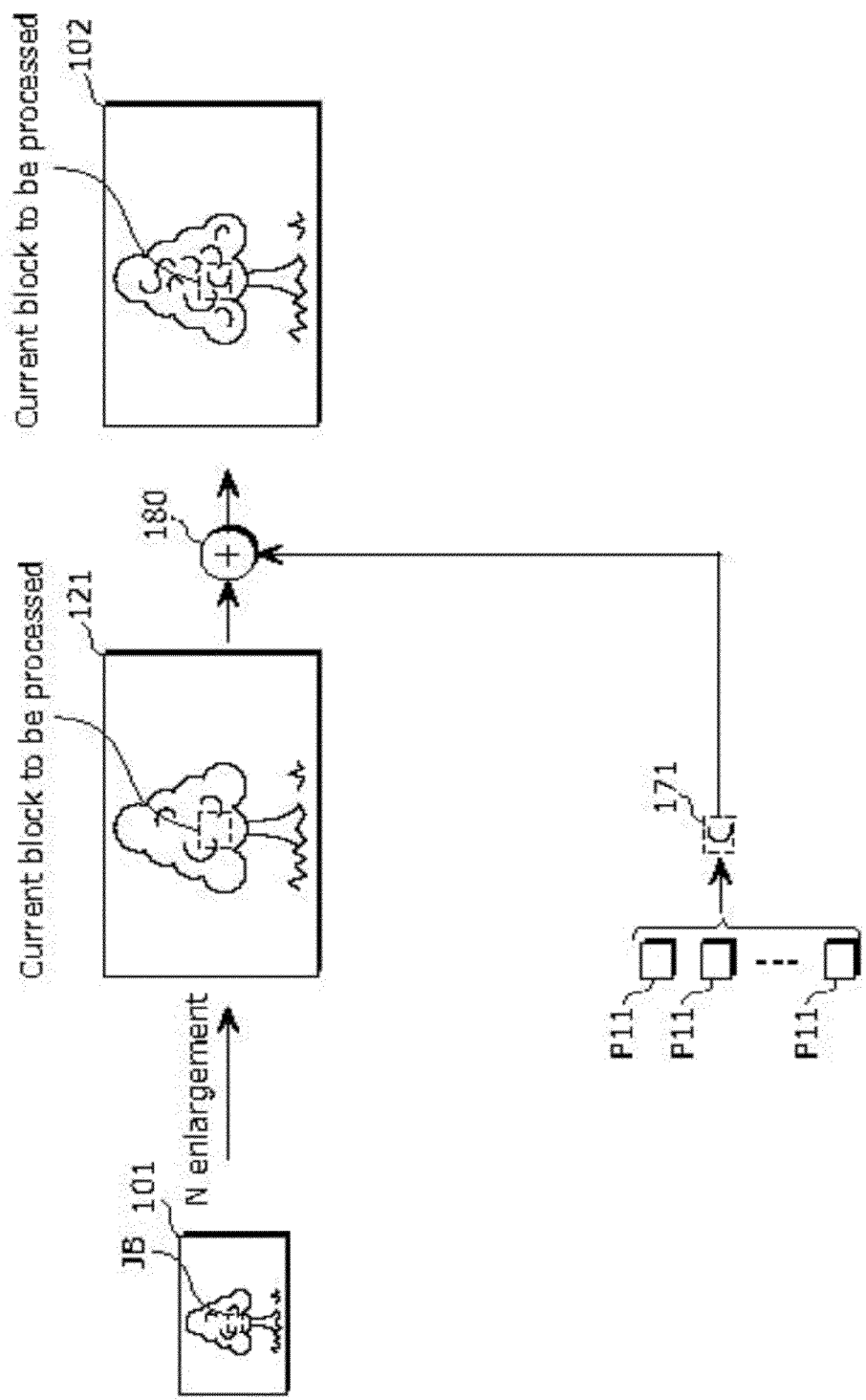
FIG. 7 illustrates an image processing method according to Embodiment 1.

At Step S1001, the image enlargement unit 120 enlarges the input image 101 by a factor N in each of the horizontal and vertical directions to generate the temporary enlarged image 121 as illustrated in FIG. 7, where N is a real number larger than 1. The process of enlarging the input image 101 uses, for example, bicubic interpolation. Embodiment 1 assumes that the input image 101 is enlarged by a factor of 2 in each of the horizontal and vertical directions, for example.

In other words, Step S1001 is a step of enlarging the input image 101 to generate an enlarged image (temporary enlarged image 121).

The technique for enlarging the input image 101 is not limited to the bicubic interpolation, and a pixel interpolation method such as spline interpolation may be used. Furthermore, enlargement factors in the horizontal and vertical directions may be different from each other. For example, when an image of 720×480 pixels are enlarged to an image of 1920× 1080 pixels, the enlargement factor of the input image in the horizontal direction is different from the enlargement factor thereof in the vertical direction.

The process of enlarging an image is not limited to enlarging the image to be larger than the input image 101. For example, the input image 101 may be enlarged by a factor N that is equal to or smaller than 1.

Figure 8:
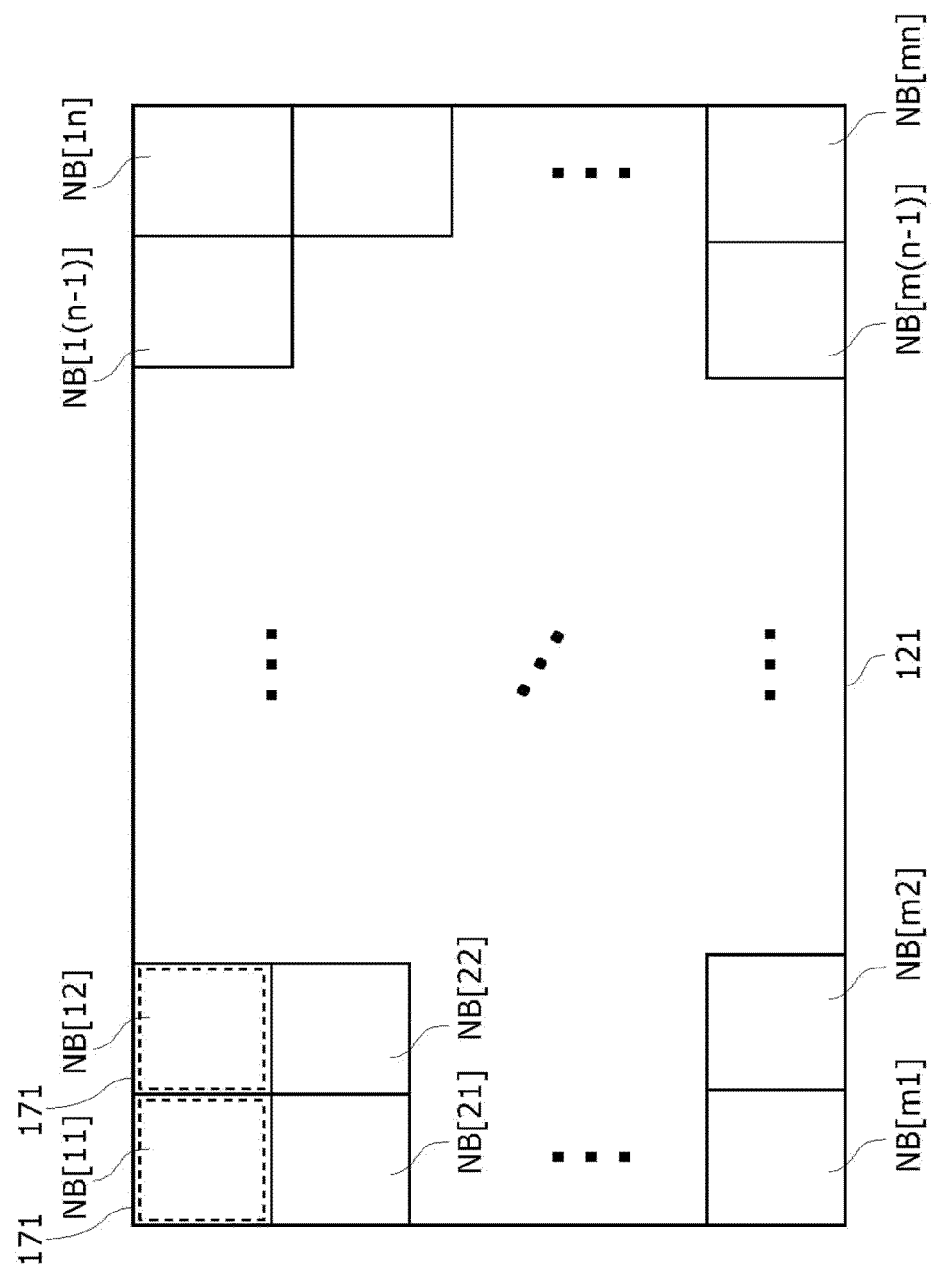
FIG. 8 illustrates a temporary enlarged image including blocks according to Embodiment 1.

As illustrated in FIG. 8, the image enlargement unit 120 partitions the temporary enlarged image 121 into blocks NB. The blocks NB are a matrix of m rows and n columns. Hereinafter, the block NB at the m-th row and the n-th column in the temporary enlarged image 121 will be denoted as a block NB [mn]. For example, the block NB at the first row and the second column in the temporary enlarged image 121 will be denoted as a block NB [12].

The block NB is smaller than the training high-frequency image P11 and the training medium-frequency image P12. The block NB has, for example, a size of horizontal 12 pixels× vertical 12 pixels.

Here, the block NB is not limited to be smaller than the training high-frequency image P11 and the training medium-frequency image P12. The block NB may be as large as the training high-frequency image P11 and the training medium-frequency image P12.

Processes from Steps S1002 to S1007 in FIG. 6 are performed on each of the blocks NB in the temporary enlarged image 121. The current block is changed to a different block NB each time the processes from Steps S1002 to S1007 are performed.

Step S1002 corresponds to the identifying, and the edge direction calculating unit 130 detects a direction of an edge (edge direction) included in the current block. More specifically, the edge direction calculating unit 130 extracts horizontal feature data F4 and vertical feature data F5 by applying a horizontal high-pass filter and a vertical high-pass filter to the current block NB, respectively. Next, the edge direction calculating unit 130 calculates the edge direction 131 using the horizontal feature data F4 and the vertical feature data F5 according to the following Equation 1.

Edge direction 131=arctan($F5/F4$)  (Equation 1)

Here, when an absolute difference between F4 and F5 is equal to or smaller than a predetermined threshold, the edge direction calculating unit 130 determines the edge direction 131=an indefinite value.

For example, as illustrated in FIGS. 9A and 9B, a (first derivative) horizontal Sobel filter and a (first derivative) vertical Sobel filter are used as the horizontal high-pass filter and the vertical high-pass filter, but not limited to these.

The edge direction calculating unit 130 may calculate the edge direction 131 as 3-value data based on a relationship between a threshold Th and the difference between the horizontal feature data F4 and the vertical feature data F5, as Equation 2 below.

When($F4-F5$)>$Th$,

Edge direction 131=90°.

When($F4-F5$)<-$Th$,

Edge direction 131=0°.

When -$Th$≤($F4-F5$)≤$Th$,

Edge direction 131=an indefinite value.  (Equation 2)

The method of calculating the edge direction 131 is a typical example, and is not limited to this.

Step S1003 corresponds to the determining. At Step S1003, the region calculating unit 140 calculates, within the temporary enlarged image 121 based on the edge direction 131, an application region to be used for searching in the training database 110.

Figure 10A:
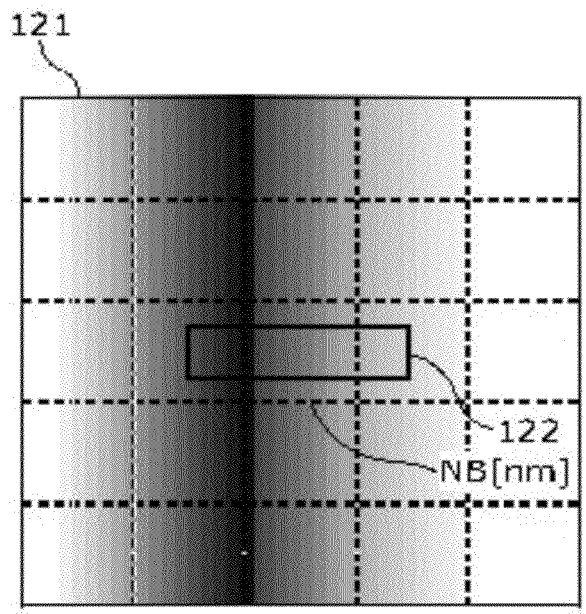
FIG. 10A illustrates an application region in a vertical edge direction according to Embodiment 1.
Figure 10B:
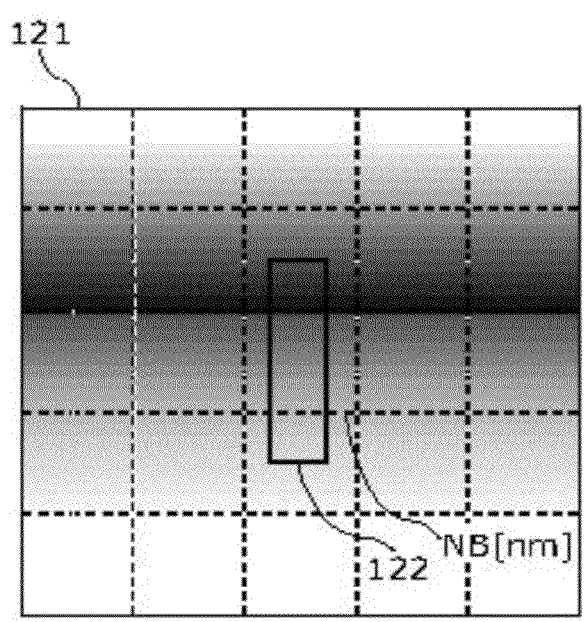
FIG. 10B illustrates an application region in a horizontal edge direction according to Embodiment 1.

FIG. 10A illustrates an application region calculated for the edge direction 131 that is vertical. FIG. 10B illustrates an application region calculated for the edge direction 131 that is horizontal.

More specifically, as illustrated in FIGS. 10A and 10B, the region calculating unit 140 calculates an application region 122 that is a rectangle having longer sides in a direction vertical to the edge direction 131 and shorter sides in a direction horizontal to the edge direction 131. In other words, the region calculating unit 140 determines, as the shape of the application region 122, the shape having a second width and a first width longer than the second width. Here, the first width is a width of the application region 122 in the direction vertical to the edge direction 131 identified at Step S1002, and the second width is a width of the application region 122 in the edge direction 131. As such, since the input image 101 includes more features in the direction vertical to the edge direction 131 than features in the edge direction 131, the super-resolution effect with higher precision can be obtained in any edge direction by determining the shape having the second width and the first width longer than the second width, as the shape of the application region 122.

Furthermore, the region calculating unit 140 determines, for each block as the shape of the application region 122 for the block, a shape having the first width and the second width. Here, the first width is longer than a width of the block in a direction vertical to an edge direction identified for the block, and the second width is shorter than a width of the block in the edge direction. More specifically, the region calculating unit 140 determines the shape of the application region 122 so that the number of pixels included in the application region 122 corresponding to the block is equal to or smaller than the number of pixels included in the block. Accordingly, since the application region 122 has a size identical to or smaller than the block corresponding to the application region 122, the searching load can be more reduced than the case of searching the training medium-frequency image P12 (similar image) that is similar to the image in the block.

Furthermore, when the edge direction 131 is determined as an indefinite value, the region calculating unit 140 calculates, as an application region, a region that is identical to the current block or a region having the different size from the current block and having the same shape as the current block.

Furthermore, the region calculating unit 140 outputs region coordinate information 141 that is information for identifying the calculated or determined application region 122, to the feature data extracting unit 150. The region coordinate information 141 indicates, for example, the coordinates, shape, and size of the application region 122.

The application region 122 is not limited to a rectangular block. For example, the application region 122 may be elliptic. The method of calculating the application region is a typical example, and is not limited to this.

Step S1004 corresponds to the extracting. At Step S1004, the feature data extracting unit 150 extracts the region feature data from the application region 122 that is within the temporary enlarged image 121 and is identified by the region coordinate information 141. More specifically, the feature data extracting unit 150 extracts an image of medium-frequency components in the application region 122 as the region feature data 151, by high-pass filtering the application region 122 by linear filtering and others. In other words, the region feature data 151 is an image of medium-frequency components that have been high-pass filtered, from among the frequency components of the application region 122. In other words, the region feature data 151 is an image of medium-frequency components in the application region 122, and an image from which low-frequency components in the application region 122 are deleted. In this case, the region feature data 151 indicates pixel values.

Here, at least a part of the frequency band of the medium-frequency components corresponding to the region feature data 151 overlaps with the frequency band of a frequency component corresponding to the training medium-frequency image P12. Furthermore, the region feature data 151 is data to be used for searching in the training database 110.

Here, the application region 122 to be processed at Step S1004 is not limited to a region within the temporary enlarged image 121. For example, the application region 122 to be processed at Step S1004 may be the current block in the input image 101.

Furthermore, the region feature data 151 is not limited to data obtained using a high-pass filter. The region feature data 151 may be, for example, luminance, chrominance, and RGB values in the application region 122. Furthermore, the region feature data 151 may be, for example, moment (average, variance, kurtosis, or skewness) obtained from the application region 122.

Furthermore, the region feature data 151 may be, for example, a feature value obtained from a co-occurrence matrix (homogeneity, heterogeneity, contrast, average, standard deviation, angular second moment, or entropy). Furthermore, the region feature data 151 may be, for example, a principal component obtained by the principal component analysis and a principal component obtained by the independent component analysis.

The region feature data 151 is a typical example, and is not limited to this.

Step S1005 includes part of the searching and the generating. At Step S1005, the training data search unit 160 calculates a similarity between the region feature data 151 and each of the K training medium-frequency images P12 stored in the training database 110. The training data search unit 160 calculates the similarity between the region feature data 151 (application region 122) and each of the training medium-frequency images P12 only using a region having the same shape and the same area as those of the region feature data 151.

Figure 11:
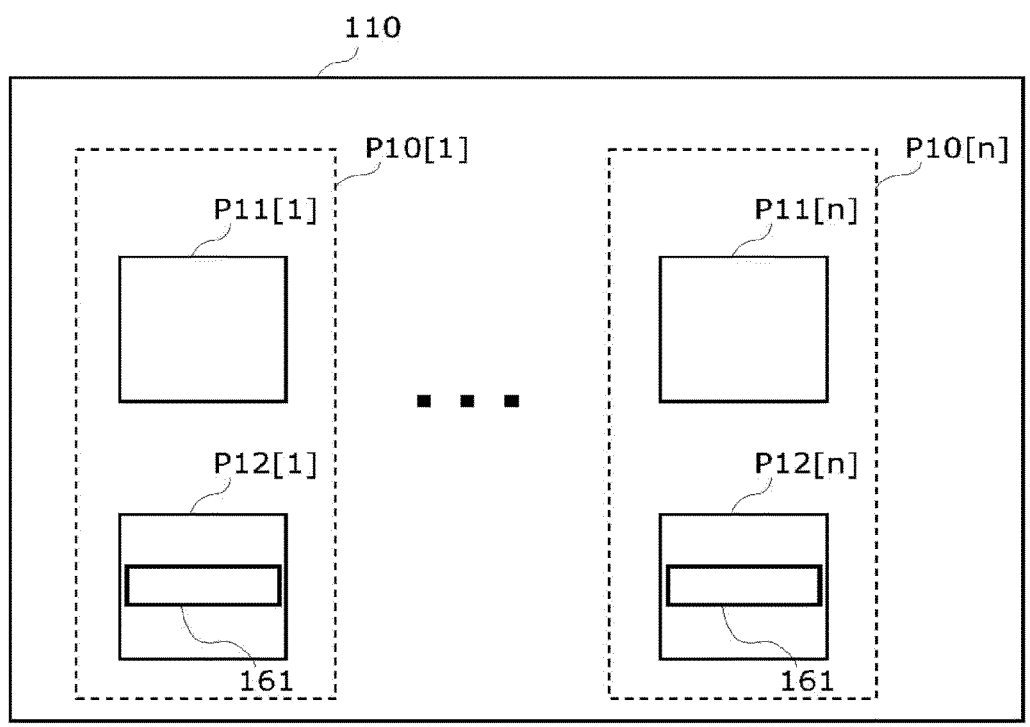
FIG. 11 illustrates processing performed by the training data search unit according to Embodiment 1.

FIG. 11 illustrates processing performed by the training data search unit 160.

As illustrated in FIG. 10A, when the edge direction 131 of the current block NB [nm] is 90° (vertical direction), the application region 122 is a rectangle having the longer sides in the horizontal direction. Here, the number of pixels in the rectangular application region 122 is 18 pixels×8 pixels (=144 pixels), which is the same as 12 pixels×12 pixels (=144 pixels) indicating the number of pixels in the current block NB [nm]. Here, the training data search unit 160 uses a comparison target region 161 having the same shape and the same area as those of the application region 122 in each of the training medium-frequency images P12 in order to calculate a similarity with the region feature data 151 as illustrated in FIG. 11. The center of gravity of the comparison target region 161 is identical to that of each of the training medium-frequency images P12.

The training data search unit 160 calculates the similarity by calculating, for example, a sum of absolute differences (Manhattan distances) between pixel values indicated by the region feature data 151 and pixel values indicated by the comparison target region 161 in each of the training medium-frequency images P12. As the sum of absolute differences is smaller, a similarity between the region feature data 151 and each of the training medium-frequency images P12 is higher. Here, the similarity may be calculated using the difference square sum (the Euclidean distance).

Then, the training data search unit 160 selects top L training medium-frequency images P12 having the higher similarity to the region feature data 151, based on the calculated similarities, where L is an integer equal to or larger than 2. L is an integer that satisfies a relational expression of 2≤L≤K. L is also a predetermined constant. In Embodiment 1, L is assumed to be 32, for example.

The selected L training medium-frequency images P12 include a training medium-frequency image P12 having the highest similarity to the region feature data 151. In other words, L similarities corresponding one-to-one to the selected L training medium-frequency images P12 are top L similarities ranked in descending order of corresponding values from among all the similarities calculated at Step S1005.

In the searching included in Step S1005, the training data search unit 160 searches the training database 110 for a plurality of the training medium-frequency images P12 each having the image similar to the image within the application region 122 having the shape determined for the current block, as similar images.

Then, the training data search unit 160 selects the L training high-frequency images P11 corresponding to the selected L training medium-frequency images P12, from among the K training high-frequency images P11 stored in the training database 110. In other words, the training data search unit 160 selects the L training high-frequency images P11 corresponding to the selected L training medium-frequency images P12 similar to the region feature data indicating the features of the current block within the temporary enlarged image 121, from among the K training high-frequency images P11 stored in the training database 110. In other words, the training data search unit 160 selects the training high-frequency images P11 (application images) associated one-to-one with the training medium-frequency images P12 obtained in searching (similar images) in the training database 110, using the training medium-frequency images P12 (similar images) as the part of the generating included in Step S1005.

Then, the training data search unit 160 transmits the selected L training high-frequency images P11 to the synthesizing unit 170.

In other words, at Step S1005, the training data search unit 160 calculates a similarity between the region feature data 151 and each of the K training medium-frequency images P12, and selects the L training high-frequency images P11 corresponding to the top L training medium-frequency images P12 having the higher similarities to the region feature data 151.

The present invention is not limited to the use of the training high-frequency images P11 indicating the high-frequency components extracted by a high-pass filter. Instead, luminance, chrominance, or RGB values of the training images P1 may be used.

The present invention is not limited to the use of the training medium-frequency images P12 indicating the medium-frequency components extracted by a low-pass filter and a high-pass filter. Instead, for example, luminance, chrominance, or RGB values of the training images P1 or moment (average, variance, kurtosis, or skewness) obtained from the training images P1 may be used. Alternatively, instead of the training medium-frequency images P12, a feature value obtained from a co-occurrence matrix (homogeneity, heterogeneity, contrast, average, standard deviation, angular second moment, or entropy) or a principal component obtained by the principal component analysis and a principal component obtained by the independent component analysis may be used.

Step S1006 includes the part of the generating. At Steps S1006, the synthesizing unit 170 generates the synthesized image 171 by synthesizing the selected L training high-frequency images P11 (application images).

Step S1007 includes part of the generating. At Step S1007, as illustrated in FIG. 7, the addition unit 180 adds the synthesized image 171 to the block NB (current block) corresponding to the synthesized image 171, in the temporary enlarged image 121. Accordingly, the resolution conversion process is performed on the current block. The synthesized image 171 is an image of a definition higher than that of the current block.

Hereinafter, the process of adding the synthesized image 171 will be described in detail by giving one example. For example, assume that the current block is the block NB [11] in the temporary enlarged image 121 in FIG. 8. Here, the synthesizing unit 170 adds pixel values of pixels included in the synthesized image 171, one-to-one to pixel values of pixels included in the block NB [11], so that the center of the synthesized image 171 matches the center of the block NB [11].

The processes from Step S1002 to S1007 are performed on all the blocks NB within the temporary enlarged image 121. Accordingly, the output image 102 is generated. In other words, with iterations of the process at Step S1007, the addition unit 180 adds the synthesized image 171 to the temporary enlarged image 121 to generate the output image 102. In other words, the addition unit 180 generates the output image 102 using the synthesized image 171.

Furthermore, with iterations of the process at Step S1007, the synthesized images 171 are added one-to-one to adjacent blocks NB in the temporary enlarged image 121, as illustrated in FIG. 8. Since the synthesized images 171 are larger than the respective blocks NB, pixels of the two synthesized images 171 are added to pixels of the blocks NB near the boundary between the two adjacent blocks NB. Here, the adjacent blocks NB are, for example, the blocks NB [11] and [12], and blocks NB [21] and [22]. In other words, the training high-frequency images P11 (application images) larger in size than the respective blocks NB and the training medium-frequency images P12 (search images) are stored in the training database 110 in association with each other according to Embodiment 1. In the generating, the adding unit 180 adds the synthesized image 171, to the current block NB and a part of at least one of the blocks NB around the current block NB so that the center of the synthesized image 171 larger than the current block NB matches the center of the current block NB. Accordingly, artifacts between the blocks in the output image 102 can be reduced.

The image processing described above is processing when the input image 101 to be processed is a still image. When the input image 101 is a moving image, the image processing is repeatedly performed for each frame included in the moving image.

Accordingly, the image processor 100 according to Embodiment 1 can generate the output image 102 having a higher resolution in any edge direction, without adding enormous processing capacity.

Since the shape of the application region 122 is not fixed and is determined according to an edge direction in Embodiment 1, an image in the application region 122 in any direction of an edge can be used. The application region 122 sufficiently includes features of the edge. Furthermore, since a similar image is searched for and the resolution conversion process is performed, using the image in the application region 122 having the determined shape, the super-resolution effect can be obtained equivalently for an edge in any direction. As a result, it is possible to suppress non-uniformity in the super-resolution effect for each block, and appropriately increase the resolution of the input image 101.

Although the synthesized image 171 generated by synthesizing the selected training high-frequency images P11 is added to the target current block in Embodiment 1, one of the selected training high-frequency images P11 may be added to the current block without generating the synthesized image 171. In other words, in the searching included at Step S1005, the training data search unit 160 searches the training medium-frequency images P12 (search images) held in the training database 110 for the training medium-frequency image P12 having the image similar to the image within the application region 122 having the shape determined for the current block, as a similar image. Then, in the generating from Steps S1005 to S1007, the training data search unit 160 selects the training high-frequency image P11 (application image) associated with the similar image obtained in the searching, from the training database 110 using the similar image. Furthermore, in the generating, the adding unit 180 adds the selected training high-frequency image P11 (application image) to the current block so as to perform the resolution conversion process on the current block.

Embodiment 2

Next, an image processor according to Embodiment 2 of the present invention will be described.

Figure 12:
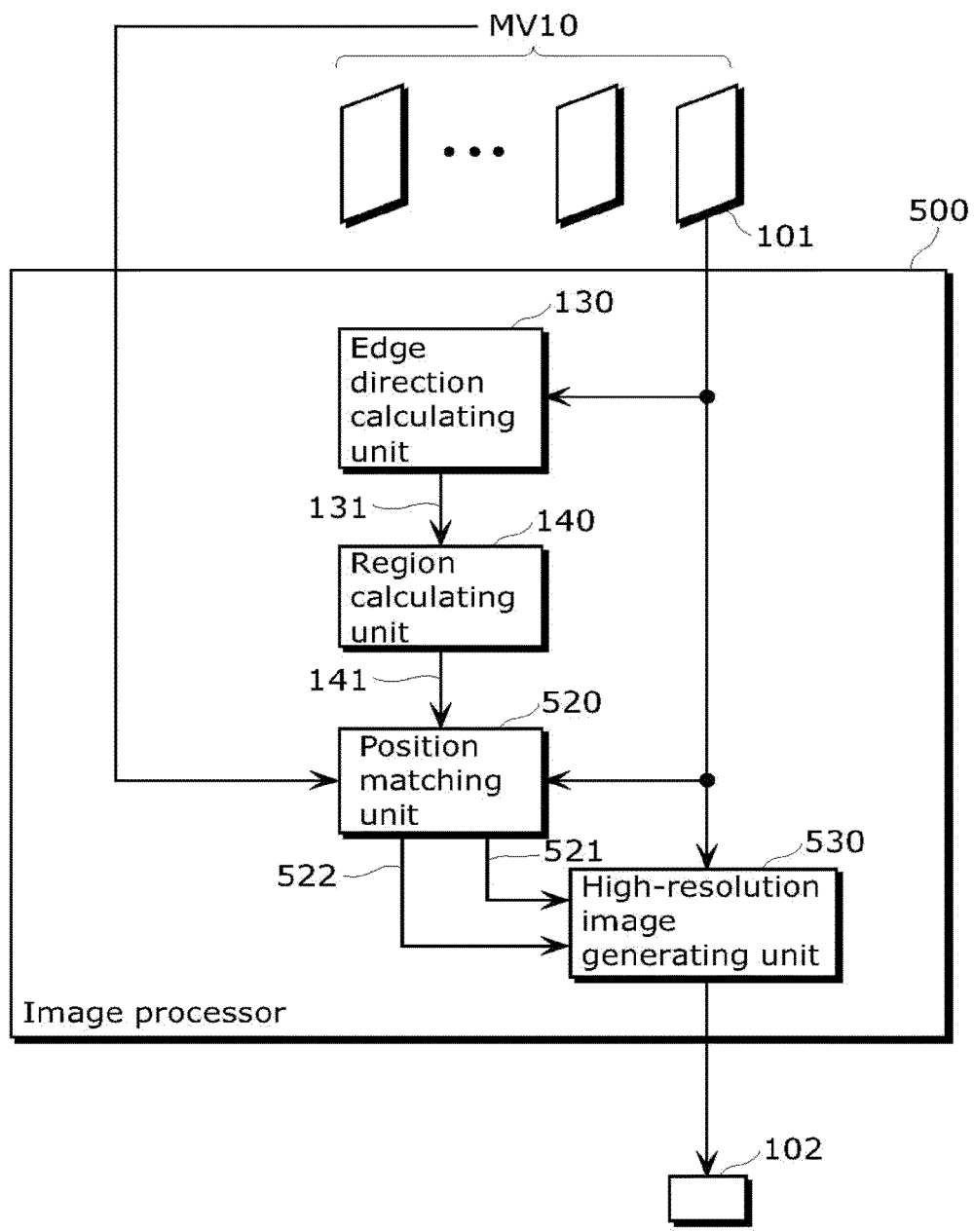
FIG. 12 is a block diagram illustrating a configuration of an image processor according to Embodiment 2 of the present invention.

FIG. 12 is a block diagram illustrating a configuration of an image processor 500 according to Embodiment 2 of the present invention. The image processor 500 according to Embodiment 2 generates an output image 102 having a resolution higher than that of an input image 101 with the super-resolution technique using the movement of images, that is, with the position matching in sub-pixel precision and pixel interpolation, without using the training database 110.

The image processor 500 receives a decoded moving image MV10 from, for example, an external decoder that is not illustrated. The moving image MV10 is, for example, a moving image decoded in accordance with the H.264/AVC standard. The moving image MV10 is not limited to the moving image in accordance with the H.264/AVC standard, and may be a moving image decoded, for example, in accordance with the MPEG-2 standard.

The moving image MV10 is assumed to be, for example, a moving image corresponding to one Group Of Pictures (GOP). The moving image MV10 includes pictures. The image processor 500 receives, for example, a first picture in display order as the input image 101 from among Q pictures included in the moving image MV10, where Q is an integer equal to or larger than 2. In Embodiment 2, the input image 101 is a still image. In Embodiment 2, Q is assumed to be 10, for example.

Although the details will be described later, according to Embodiment 2, a position of an application region corresponding to each block included in the low-resolution input image 101 is matched to a position of a corresponding one of L low-resolution reference images, and interpolation pixel values are estimated based on a result of the matching so as to generate the output image 102. Here, L denotes a predetermined fixed number. Each of the L low-resolution reference images is different from the input image 101 and is a picture included in the Q pictures.

As illustrated in FIG. 12, the image processor 500 includes an edge direction calculating unit 130, a region calculating unit 140, a position matching unit 520, and a high-resolution image generating unit 530.

The edge direction calculating unit 130 calculates an edge direction 131 for each of the blocks included in the input image 101 in the same manner as Embodiment 1. The region calculating unit 140 calculates, for each of the blocks included in the input image 101, an application region 122 corresponding to the block, in the edge direction 131 calculated for the block. Furthermore, the region calculating unit 140 outputs region coordinate information 141 that is information for identifying the application region 122.

The position matching unit 520 receives the moving image MV10 including the Q pictures from, for example, the external decoder that is not illustrated. The position matching unit 520 performs a position matching process. The details will be described later. The position matching unit 520 matches the position of the application region 122 calculated for the current block, to a position of a corresponding one of the L reference images. In other words, the position matching unit 520 matches a position of a picture other than the input image 101, among the moving image MV10 that include the input image 101 and pictures, to the position of the image in the application region 122 having the determined shape to search for a similar image corresponding to the current block. The position matching is performed with, for example, sub-pixel precision.

Figure 13:
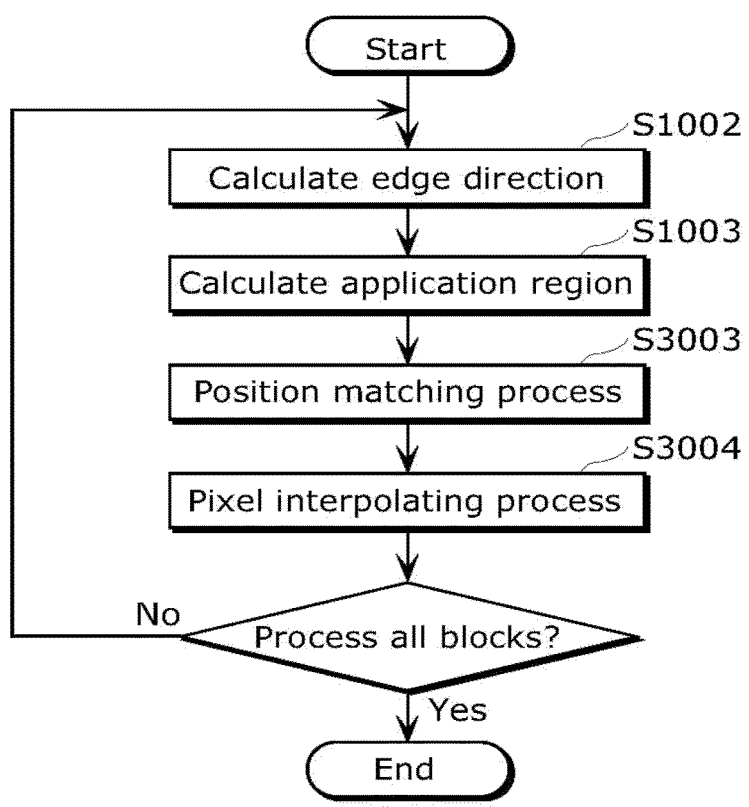
FIG. 13 is a flowchart of the image processing performed by the image processor according to Embodiment 2.

FIG. 13 is a flowchart of the image processing performed by the image processor 500 according to Embodiment 2.

The input image 101 is partitioned into blocks. Hereinafter, the current block to be processed among blocks included in the input image 101 will also be referred to as a current block PB. The current block PB has, for example, a size of horizontal 8 pixels×vertical 8 pixels.

At Step S1002, the edge direction calculating unit 130 calculates the edge direction 131 that is a direction of an edge included in the current block PB as in Embodiment 1. Then, the edge direction calculating unit 130 transmits the calculated edge direction 131 to the region calculating unit 140.

At Step S1003, the region calculating unit 140 calculates the application region 122 included in the input image 101 and corresponding to the current block PB, based on the edge direction 131 of the current block PB as in Embodiment 1. Furthermore, the region calculating unit 140 outputs, to the position matching unit 520, the region coordinate information 141 that is information for identifying the application region 122.

Step S3003 corresponds to the searching according to Embodiment 2, and the position matching process is performed at Step S3003. In the position matching process, the position matching unit 520 matches the position of the application region 122 that is included in the input image 101 and is identified by the region coordinate information 141, to the position of each of the L reference images.

More specifically, the position matching unit 520 determines, for example, the second to (L+1)-th pictures in display order from among the Q pictures as reference images. Embodiment 2 is described assuming L=4.

Figure 14:
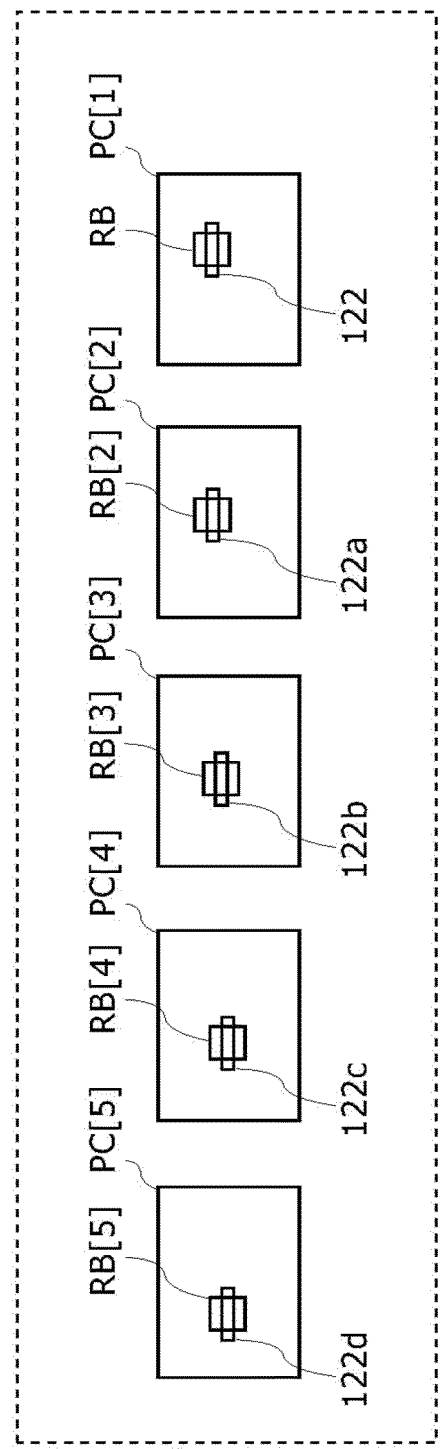
FIG. 14 illustrates a position matching process according to Embodiment 2.

FIG. 14 illustrates the position matching process.

FIG. 14 exemplifies pictures PC[1], PC[2], PC[3], PC[4], and PC[5]. The pictures PC[1] to PC[5] respectively correspond to the first to fifth pictures.

The picture PC[1] is the input image 101. In the picture PC[1], the current block PB and the application region 122 calculated for the current block PB are indicated. The pictures PC[2] to PC[5] are reference images. The reference images are searched for respective similar images 122a to 122d that are similar to the image in the application region 122 in the position matching process. A block RB [n (integer)] in each of the reference images is a reference block corresponding to a corresponding one of the similar images 122a to 122d.

In the position matching process, the position matching unit 520 matches the position of the current block PB to the position of each of the pictures PC[2], PC[3], PC[4], and PC[5]. For example, the position matching unit 520 interpolates pixels in each of the reference images, by calculating pixel values of sub-pixels of each of the reference images.

Then, the position matching unit 520 detects (searches), from the respective reference images, the similar images 122a to 122d that are similar to the image in the application region 122 with the sub-pixel precision. For example, the position matching unit 520 detects the similar image so that a sum of absolute differences between each pixel value of the application region 122 and a pixel value of the corresponding similar image is the smallest. Furthermore, the position matching unit 520 detects displacement in a position each between the application region 122 and two of the similar images 122a to 122d, as a displacement amount (motion vector) 521 with sub-pixel precision. Then, the position matching unit 520 outputs, to the high-resolution image generating unit 530, (i) the displacement amount 521 detected for each of the reference images and (ii) the reference image as reference data 522.

Step S3004 corresponds to the generating according to Embodiment 2, and the pixel interpolating process is performed at Step S3004. In the pixel interpolating process, the high-resolution image generating unit 530 extracts or obtains, from the reference data 522 (reference images), the reference block RB at a position displaced from the current block PB by the displacement amount 521 detected for each of the reference images. Then, the high-resolution image generating unit 530 performs the resolution conversion process on the current block PB by interpolating the pixels in the current block PB using the pixels of the reference blocks RB[2] to RB[5] extracted from the reference images.

The processes from Step S1002, S1003, S3003, and S3004 are performed on all the blocks within the input image 101. Accordingly, the output image 102 is generated. In other words, with iterations of the process at Step S3004, the high-resolution image generating unit 530 generates the output image 102 having a resolution higher than that of the input image 101.

The processes from Step S1002, S1003, S3003, and S3004 may be performed on, not limited to all the blocks in the input image 101, a block designated in the input image 101.

Since in Embodiment 2, the shape of the application region 122 is not fixed and is determined according to an edge direction as in Embodiment 1, the super-resolution effect can be obtained equivalently for an edge in any direction. As a result, it is possible to suppress non-uniformity in the super-resolution effect for each block, and appropriately increase the resolution of the input image 101. Furthermore, the similar images for the current block PB are searched for by matching the position of the picture other than the input image to the position of the image within the application region 122 with the sub-pixel precision, that is, by performing the motion estimation and the motion compensation with the sub-pixel precision. Thus, it is possible to appropriately increase the resolution of the moving image.

Embodiment 3

The processing described in each of Embodiments can be easily implemented by an independent computer system, by recording a program for realizing the image processing method described in Embodiment on a recording medium such as a flexible disk.

Figure 15A:
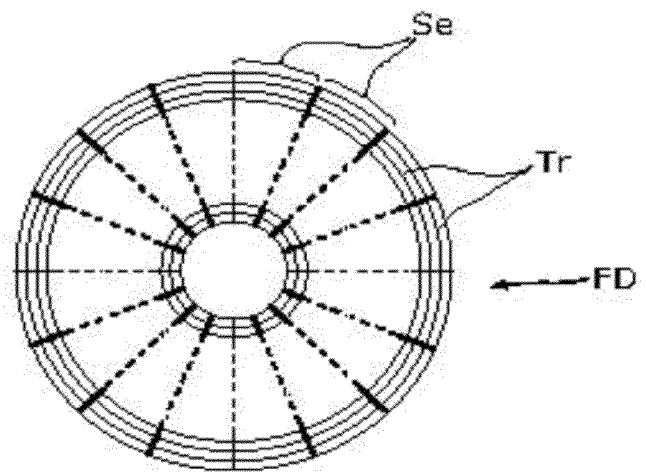
FIG. 15A illustrates an example of a physical format of a flexible disk according to Embodiment 3 of the present invention.
Figure 15B:
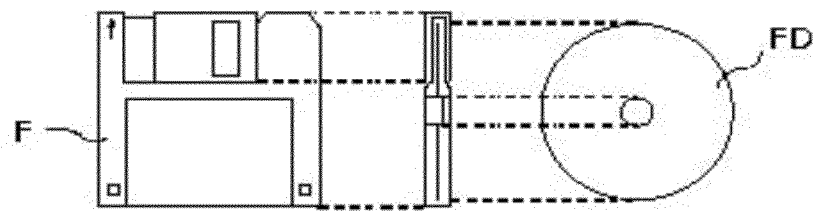
FIG. 15B illustrates a front appearance of the flexible disk, a cross section of the flexible disk, and the flexible disk according to Embodiment 3.
Figure 15C:
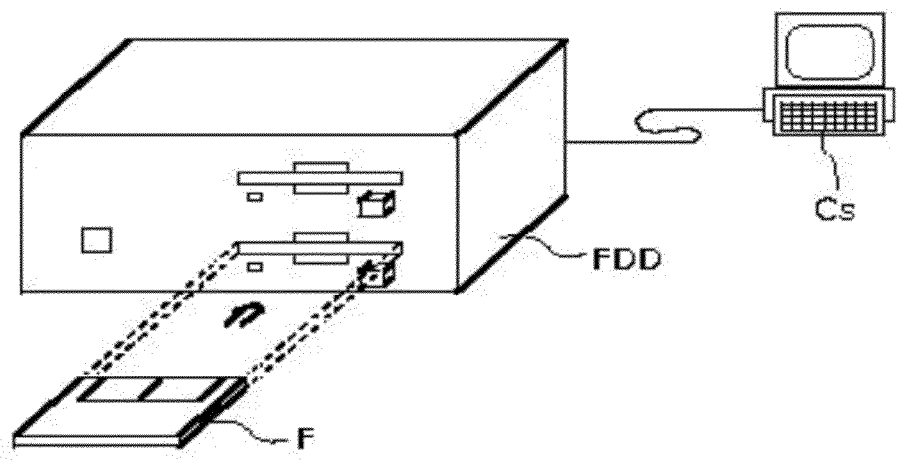
FIG. 15C illustrates a configuration for recording a program on a flexible disk and reproducing the program according to Embodiment 3.

FIGS. 15A to 15C are diagrams explaining a case where the image processing method in each of Embodiments is implemented by a computer system using the program recorded on a recording medium such as a flexible disk.

FIG. 15B illustrates a front appearance of the flexible disk, a cross section of the flexible disk, and the flexible disk. FIG. 15A illustrates an example of a physical format of the flexible disk as the recording medium body. A flexible disk FD is contained in a case F, and tracks Tr are concentrically formed on a surface of the flexible disk FD from outer to inner peripheries. Each track is divided into 16 sectors Se in an angular direction. This being so, in the flexible disk FD storing the above-mentioned program, the program is recorded in an area allocated on the flexible disk FD.

Furthermore, FIG. 15C illustrates a configuration for recording the program on the flexible disk FD and reproducing the program. In the case of recording the program for implementing the image processing method on the flexible disk FD, the program is written from a computer system Cs via a flexible disk drive FDD. In the case of implementing the image processing method on the computer system Cs by the program recorded on the flexible disk FD, the program is read from the flexible disk FD and transferred to the computer system Cs via the flexible disk drive FDD.

Although the above describes an example of using the flexible disk as a recording medium, an optical disc may equally be used. Moreover, the recording medium is not limited to such, and any recording medium such as an integrated circuit (IC) card and a read-only memory (ROM) cassette is applicable so long as the program can be recorded.

Embodiment 4

Figure 16:
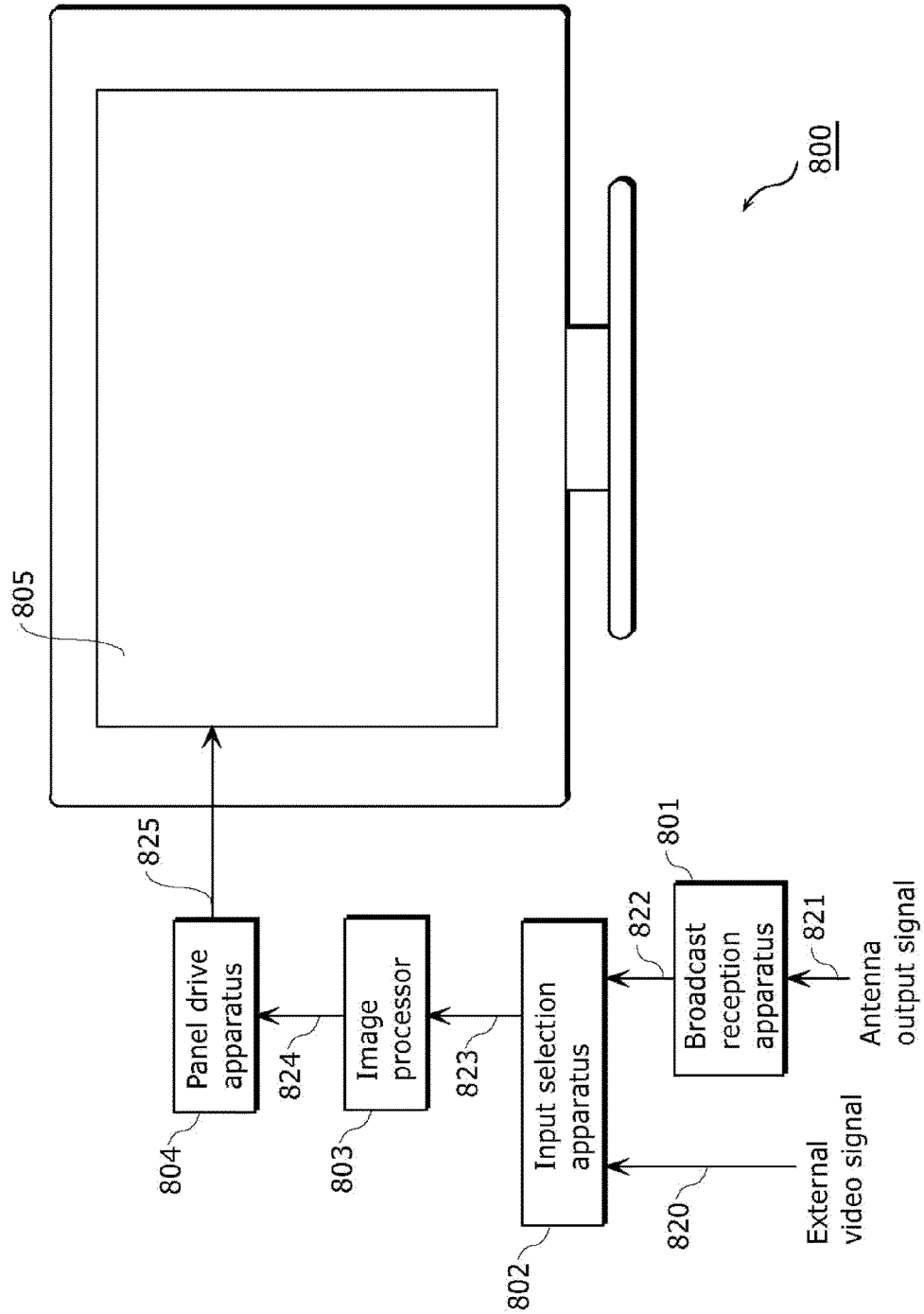
FIG. 16 illustrates a configuration of a television receiver according to Embodiment 4 of the present invention.

FIG. 16 illustrates a configuration of a television receiver 800 according to Embodiment 4 in the present invention, using the image processor and the image processing method according to each of above Embodiments.

The television receiver 800 includes a broadcast reception apparatus 801, an input selection apparatus 802, an image processor 803, a panel drive apparatus 804, and a display panel 805. Although the apparatuses 801 to 804 are located outside the display panel 805 in FIG. 16, the apparatuses 801 to 804 may be located inside the display panel 805.

The image processor 803 has the same functions and configuration as those of the image processor 100 according to one of Embodiments 1 and 2.

The broadcast reception apparatus 801 receives broadcast waves from an antenna output signal 821 outputted from an external antenna (not illustrated), and outputs a video signal obtained by demodulating the broadcast waves, as a broadcast video signal 822.

The input selection apparatus 802 selects one of the broadcast video signal 822 and an external video signal 820 that is outputted from a recorder such as a digital versatile disc (DVD) and a Blu-ray Disc (BD), or an external video appliance such as a DVD and a BD player, according to the user's selection. The input selection apparatus 802 outputs the selected video signal as an input video signal 823.

In the case where the input video signal 823 is an interlace signal, the image processor 803 converts the input video signal 823 into a progressive signal. In other words, the image processor 803 performs I/P conversion on the input video signal 823. Furthermore, the image processor 803 may perform image quality improvement processing for improving contrast on the input video signal 823.

Furthermore, the image processor 803 performs the image processing on the input video signal 823 according to the image processing method of one of Embodiments 1 and 2. Then, the image processor 803 outputs a result of the processing as a quality-improved video signal 824.

The panel drive apparatus 804 converts the quality-improved video signal 824 into a dedicated signal for driving the display panel 805, and outputs the dedicated signal as a panel drive video signal 825.

The display panel 805 converts an electrical signal into an optical signal according to the panel drive video signal 825, and displays desired video based on the obtained optical signal.

In such a way, the image processor or the image processing method according to each of Embodiments is applicable to the television receiver 800. This allows the television receiver 800 to achieve the advantages described in each of Embodiments. Note that the image processor or the image processing method according to each of Embodiments is not limited to the application to a television receiver, and may equally be used in various digital video appliances such as a recorder, a player, and a mobile appliance. In all cases, the advantages described in Embodiments can be achieved.

Examples of the recorder include a DVD recorder, a BD recorder, and a hard disk recorder. Examples of the player include a DVD player and a BD player. Examples of the mobile appliance include a mobile phone and a Personal Digital Assistant (PDA).

Although the image processor and the image processing method according to the present invention or other aspects thereof are described based on each of Embodiments, the present invention is not limited to Embodiments.

Figure 17:
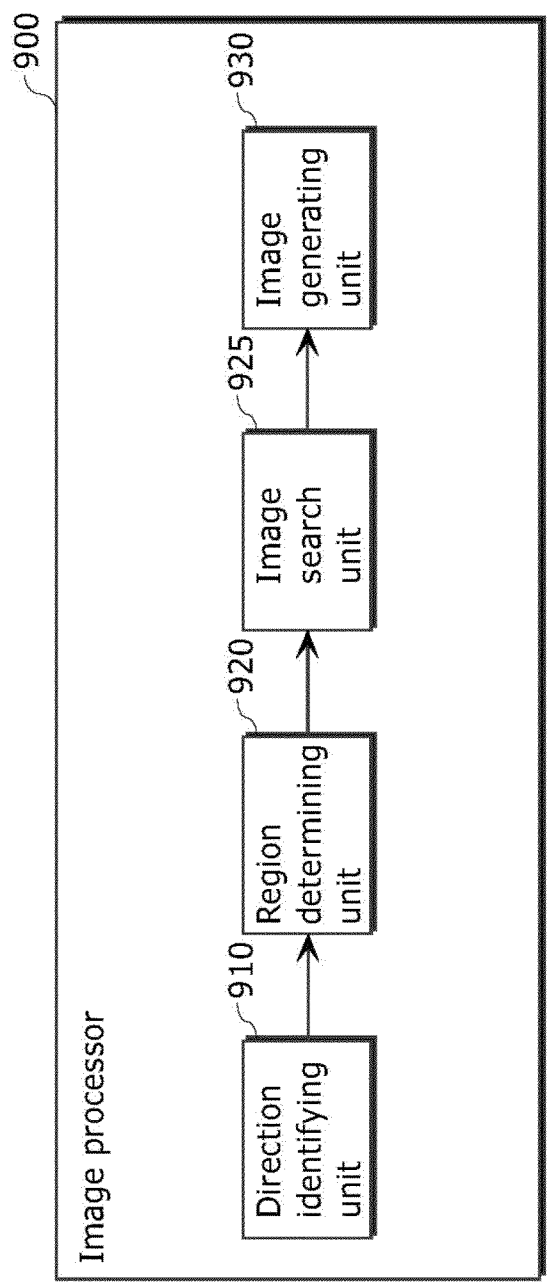
FIG. 17 is a block diagram illustrating a functional configuration of an image processor according to another aspect of the present invention.

For example, as illustrated in FIG. 17, the image processor according to the present invention may include the general or comprehensive configuration of Embodiments 1 and 2 as another aspect.

FIG. 17 is a block diagram illustrating a functional configuration of an image processor 900 according to another aspect of the present invention.

The image processor 900 is an apparatus that generates, using an input image, an output image having a resolution higher than a resolution of the input image, and includes a direction identifying unit 910, a region determining unit 920, an image search unit 925, and an image generating unit 930.

The direction identifying unit 910 identifies an edge direction that is a direction along an edge included in the input image. The direction identifying unit 910 corresponds to the edge direction calculating unit 130 according to one of Embodiments 1 and 2.

The region determining unit 920 determines the shape of an application region that is a region including at least a part of an edge, according to the edge direction identified by the direction identifying unit 910. The region determining unit 920 corresponds to the region calculating unit 140 according to one of Embodiments 1 and 2.

The image search unit 925 searches for an image similar to an image within the application region having the shape determined by the region determining unit 920. The image search unit 925 is implemented by a part of the functional blocks included in the training data search unit 160 according to Embodiment 1. In other words, the image search unit 925 corresponds to a part of the functional blocks included in the training data search unit 160 that searches the training database 110 for a plurality of the training medium-frequency images P12 similar to the region feature data 151 of the application region 122. Alternatively, the image search unit 925 is implemented by part of the functional blocks included in the position matching unit 520 according to Embodiment 2. In other words, the image search unit 925 corresponds to part of the functional blocks included in the position matching unit 520 that searches a plurality of reference images for similar images similar to the image of the application region 122 by performing a position matching process.

The image generating unit 930 generates the output image by performing the resolution conversion process on the input image, using the similar image so that the input image includes high-frequency components. The image generating unit 930 is implemented by the training database 110, part of functional blocks of the training data search unit 160, and functional blocks including the synthesizing unit 170 and the adding unit 180, according to Embodiment 1. Furthermore, the image generating unit 930 is implemented by the high-resolution image generating unit 530 according to Embodiment 2.

Furthermore, the image processing method corresponding to the image processor 900 includes, as steps, the processes performed by the direction identifying unit 910, the region determining unit 920, the image search unit 925, and the image generating unit 930.

Part or all of the direction identifying unit 910, the region determining unit 920, the image search unit 925, and the image generating unit 930 included in the image processor 900 may be included in hardware, such as a system large scale integration (LSI). Furthermore, part or all of the direction identifying unit 910, the region determining unit 920, the image search unit 925, and the image generating unit 930 may be a module of a program executed by a processor, such as a central processing unit (CPU). Furthermore, the image processor 900 may be implemented as an integrated circuit.

For example, the size of the training high-frequency images P11 may be different from the size of the training medium-frequency images P12, where the training medium-frequency images P12 and the training high-frequency images P11 are stored in the training database 110. Furthermore, in this case, the training high-frequency images P11 may be searched for (selected) using, for example, the input image 101 instead of the temporary enlarged image 121 according to Embodiment 1.

Furthermore, obviously, the present invention includes, for example, an optical disc recording apparatus, a moving image transmitting apparatus, a digital television broadcasting apparatus, a Web server, a communication apparatus, and a mobile information terminal each of which includes the image processor according to each of Embodiments. Similarly, the present invention obviously includes a moving image receiving apparatus, a moving image recording apparatus, a still image recording apparatus, a digital television broadcast receiving apparatus, a communication apparatus, and a mobile information terminal each of which includes the image processor according to each of Embodiments. Here, examples of the moving image recording apparatus include a camcorder and a web server, and examples of the still image recording apparatus include a digital still camera.

The values used in all Embodiments are examples of values for specifically describing the present invention. In other words, the present invention is not limited to each of the values used in Embodiments.

Furthermore, the image processing method according to the present invention does not necessarily have to include all the steps in FIG. 6. In other words, the image processing method according to the present invention has only to include steps as little as possible to produce the advantages of the present invention.

Furthermore, the order for performing the steps included in the image processing method according to each of Embodiments is an example for specifically describing the present invention, and the other orders may be used. Furthermore, part of the steps in the image processing method may be performed in parallel with and separately from the other steps. For example, in FIG. 6, Steps S1002 and 1003 may be performed in parallel with and separately from Steps S1004 and 1005.

Part or all of the functional patches (constituent elements) of each of the image processors 100 to 500 are typically implemented as a system large scale integration (LSI) that is an integrated circuit. These patches can be separately made in a plurality of single-function LSIs, or also can be made in one integrated LSI to include part or all of the patches.

The name used here is LSI, but it may also be called IC, system LSI, super LSI, or ultra LSI depending on the degree of integration.

Moreover, not only the LSI, but also a dedicated circuit or a general purpose processor and so forth can also achieve the integration. Field Programmable Gate Array (FPGA) that can be programmed after manufacturing LSI or a reconfigurable processor that allows re-configuration of the connection or configuration of LSI can be used for the same purpose.

Moreover, with advancement in semiconductor technology and appearance of derivatives of the technology that may replace LSI, the functional patches may be integrated using that technology. Application of biotechnology is one such possibility.

Furthermore, among these patches (constituent elements), a portion for storing data to be searched for can be differently configured without being made in one integrated LSI.

Each of the constituent elements may be implemented by dedicated hardware or executing a software program suitable for the constituent element. Each of the constituent elements may be implemented by reading a software program recorded on a recording medium, such as a hard disk or a semiconductor memory, using a program executing unit, such as a CPU and a processor. The software that implements the image processor according to each of Embodiments is the following program.

In other words, the program causes a computer to execute: identifying an edge direction that is a direction along an edge included in the input image; determining a shape of an application region according to the identified edge direction, the application region being a region including at least a part of the edge; searching for an image similar to an image within the application region having the determined shape; and generating the output image by performing a resolution conversion process on the input image using the similar image so that the input image includes high-frequency components.

Although the image processor and the image processing method according to one or more aspects of the present invention are described based on each of Embodiments, the present invention is not limited to Embodiments. Without departing from the scope of the present invention, the one or more aspects of the present invention may include an embodiment with some modifications conceived by a person skilled in the art on each of Embodiment, and an embodiment by combining the constituent elements included in different Embodiments.

Embodiments disclosed this time are exemplifications in all respects, and should be regarded as not limiting the scope of the present invention. The scope of the present invention is indicated not by the description but by Claims, and is intended to include all the modifications within Claims, meanings of equivalents, and the scope of the equivalents.

The image processing method and the image processor according to the present disclosure enable generation of a high-resolution image with higher definition, and is applicable to, for example, a camcorder and a digital still camera.

The invention claimed is:

1. An image processing method of generating, using an input image, an output image having a resolution higher than a resolution of the input image, the method comprising:
   identifying an edge direction that is a direction along an edge included in the input image;
   determining a shape of an application region according to the identified edge direction, the application region being a region including at least a part of the edge;
   searching for an image similar to an image within the application region having the determined shape; and generating the output image by performing a resolution conversion process on the input image using the similar image so that the input image includes high-frequency components, wherein in the determining of the shape, a shape having a second width and a first width longer than the second width is determined as the shape of the application region, the second width being a width of the application region in the identified edge direction and the first width being a width of the application region in a direction vertical to the edge direction.

2. The image processing method according to claim 1, wherein in the identifying, an edge direction of an edge is identified for each of blocks included in the input image, the edge being included in the block, in the determining, a shape of an application region is determined for each of the blocks, according to the edge direction identified for the block, in the searching, an image similar to an image within the application region having the shape determined for the block is searched for each of the blocks, and in the generating, the output image is generated by performing the resolution conversion process on each of the blocks using the similar image that is searched for the block.

3. The image processing method according to claim 2, wherein in the determining, a shape having the first width and the second width is determined for each of the blocks as the shape of the application region for the block, the first width being longer than a width of the block in a direction vertical to the edge direction, the second width being shorter than a width of the block in the edge direction, and the edge direction being identified for the block.

4. The image processing method according to claim 3, wherein in the determining, the shape of the application region is determined so that the number of pixels included in the application region corresponding to each of the blocks is equal to or smaller than the number of pixels included in the block.

5. The image processing method according to claim 2, wherein in the searching, (i) a database is used, the database holding a plurality of search images, and a plurality of application images associated one-to-one with the search images and including more high-frequency components than high-frequency components of the search images, and (ii) the search images held in the database are searched for, as the similar image, a search image including an image similar to an image within an application region having a shape determined for a current block to be processed, and in the generating, the resolution conversion process is performed on the current block by selecting, from the database using the similar image obtained in the searching, an application image associated with the similar image and adding the selected application image to the current block.

6. The image processing method according to claim 5, wherein in the searching, the database is searched for a plurality of search images as a plurality of similar images, the search images each including an image similar to the image within the application region having the shape determined for the current block, and in the generating, the resolution conversion process is performed on the current block by (i) selecting, from the database using the similar images obtained in the searching, a plurality of application images associated one-to-one with the similar images, (ii) generating a synthesized image by synthesizing the selected application images, and (iii) adding the synthesized image to the current block.

7. The image processing method according to claim 6, wherein a plurality of application images larger in size than the blocks are held in the database in one-to-one association with the search images, and in the generating, the synthesized image is added to the current block and a part of at least one of the blocks around the current block so that the center of the synthesized image matches the center of the current block, the synthesized image being larger than the current block.

8. The image processing method according to claim 5, further comprising enlarging the input image, wherein the identifying, the determining, the searching, and the generating are performed on each of blocks included in the enlarged input image.

9. The image processing method according to claim 8, further comprising extracting, as medium-frequency components from each of the blocks included in the enlarged input image, frequency components excluding low-frequency components, wherein in the searching, a search image is searched for each of the blocks, the search image including an image similar to an image of the medium-frequency components within an application region having a shape determined for the block.

10. The image processing method according to claim 2, wherein in the searching, a similar image corresponding to a current block to be processed is searched for by matching a position of the image within the application region having the determined shape to a position of a picture included in a moving image, the picture being other than the input image, and the moving image including the input image that is a picture, and in the generating, a reference block including at least a part of the similar image obtained in the searching is obtained from the picture other than the input image using the similar image, and the resolution conversion process is performed on the current block by interpolating pixels in the current block using pixels in the reference block.

11. An image processor that generates, using an input image, an output image having a resolution higher than a resolution of the input image, the image processor comprising:

a direction identifying unit configured to identify an edge direction that is a direction along an edge included in the input image;

a region determining unit configured to determine a shape of an application region according to the identified edge direction, the application region being a region including at least a part of the edge;

an image search unit configured to search for an image similar to an image within the application region having the determined shape; and an image generating unit configured to generate the output image by performing a resolution conversion process on the input image using the similar image so that the input image includes high-frequency components, wherein a shape having a second width and a first width longer than the second width is determined as the shape of the application region determined by the determining unit, the second width being a width of the application region in the identified edge direction and the first width being a width of the application region in a direction vertical to the edge direction.

12. An integrated circuit that generates, using an input image, an output image having a resolution higher than a resolution of the input image, the integrated circuit comprising:
a direction identifying unit configured to identify an edge direction that is a direction along an edge included in the input image;
a region determining unit configured to determine a shape of an application region according to the identified edge direction, the application region being a region including at least a part of the edge;
an image search unit configured to search for an image similar to an image within the application region having the determined shape; and
an image generating unit configured to generate the output image by performing a resolution conversion process on the input image using the similar image so that the input image includes high-frequency components,
wherein a shape having a second width and a first width longer than the second width is determined as the shape of the application region determined by the determining unit, the second width being a width of the application region in the identified edge direction and the first width being a width of the application region in a direction vertical to the edge direction.

13. A non-transitory computer-readable recording medium on which a program for generating, using an input image, an output image having a resolution higher than a resolution of the input image is recorded, the program causing a computer to execute:
identifying an edge direction that is a direction along an edge included in the input image;
determining a shape of an application region according to the identified edge direction, the application region being a region including at least a part of the edge;
searching for an image similar to an image within the application region having the determined shape; and
generating the output image by performing a resolution conversion process on the input image using the similar image so that the input image includes high-frequency components,
wherein in the determining of the shape, a shape having a second width and a first width longer than the second width is determined as the shape of the application region, the second width being a width of the application region in the identified edge direction, and the first width being a width of the application region in a direction vertical to the edge direction.

* * * * *